(12) United States Patent
Lin et al.

(10) Patent No.: US 8,090,901 B2
(45) Date of Patent: Jan. 3, 2012

(54) TCAM MANAGEMENT APPROACH THAT MINIMIZE MOVEMENTS

(75) Inventors: Kevin Kwun-Nan Lin, Saratoga, CA (US); Gefan Zhang, San Jose, CA (US); Rajeshekhar Murtinty, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 381 days.

(21) Appl. No.: 12/466,277

(22) Filed: May 14, 2009

(65) Prior Publication Data

US 2010/0293327 A1    Nov. 18, 2010

(51) Int. Cl.
*G06F 13/00* (2006.01)
*G11C 15/00* (2006.01)

(52) U.S. Cl. ............... 711/108; 711/E12.001; 365/49.1; 365/49.16

(58) Field of Classification Search .................. 711/108, 711/E12.001; 365/49.1, 49.16
See application file for complete search history.

(56) References Cited

U.S. PATENT DOCUMENTS

| | | | |
|---|---|---|---|
| 3,866,175 A | 2/1975 | Seifert, Jr. et al. | |
| 4,325,119 A | 4/1982 | Grandmaison et al. | |
| 4,348,725 A | 9/1982 | Farrell et al. | |
| 4,628,480 A | 12/1986 | Floyd | |
| 4,667,323 A | 5/1987 | Engdahl et al. | |
| 4,683,564 A | 7/1987 | Young et al. | |
| 4,698,748 A | 10/1987 | Juzswik et al. | |
| 4,723,243 A | 2/1988 | Joshi et al. | |
| 4,754,482 A | 6/1988 | Weiss | |
| 4,791,629 A | 12/1988 | Burns et al. | |
| 4,794,629 A | 12/1988 | Pastyr et al. | |
| 4,807,280 A | 2/1989 | Posner et al. | |
| 4,876,681 A | 10/1989 | Hagiwara et al. | |
| 4,896,277 A | 1/1990 | Vercellotti et al. | |
| 4,985,889 A | 1/1991 | Frankish et al. | |
| 5,101,404 A | 3/1992 | Kunimoto et al. | |

(Continued)

FOREIGN PATENT DOCUMENTS

EP    1380127 A2    1/2004

(Continued)

OTHER PUBLICATIONS

"Skip Lists: A Probabilistic Alternative to Balanced Trees," 8 pages, at URL: http://epaperpress.com/sortsearch/download/skiplist.pdf, Jun. 1990.

(Continued)

*Primary Examiner* — Ly D Pham
(74) *Attorney, Agent, or Firm* — Kilpatrick Townsend & Stockton LLP

(57) ABSTRACT

Methods for efficiently managing a ternary content-addressable memory (TCAM) by minimizing movements of TCAM entries include determining a first node and a second node in the TCAM, determining if there is a free TCAM entry between the first node and the second node, and storing the new entry in the free TCAM entry. Upon determining that a free TCAM entry does not exist between the first node and the second node, further determining a chain of nodes and then determining if there is a free TCAM entry in the chain of nodes. Upon determining that there is a free TCAM entry within the chain of nodes, moving the TCAM entries identified as the nodes in the chain of nodes to generate a free node nearest to the new entry and inserting the new entry in the free node. Moving the TCAM entries identified as the nodes in the chain of nodes preserves the order of the nodes.

17 Claims, 8 Drawing Sheets

U.S. PATENT DOCUMENTS

| | | |
|---|---|---|
| 5,136,584 A | 8/1992 | Hedlund |
| 5,195,181 A | 3/1993 | Bryant et al. |
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,299,190 A | 3/1994 | LaMaire et al. |
| 5,299,195 A | 3/1994 | Shah |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A | 12/1994 | Clark |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,506,841 A | 4/1996 | Sandquist |
| 5,521,923 A | 5/1996 | Willmann et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson, Jr. |
| 5,646,878 A | 7/1997 | Samra |
| 5,663,952 A | 9/1997 | Gentry, Jr. |
| 5,663,959 A | 9/1997 | Nakagawa |
| 5,666,353 A | 9/1997 | Klausmeier et al. |
| 5,721,819 A | 2/1998 | Galles et al. |
| 5,732,080 A | 3/1998 | Ferguson et al. |
| 5,734,826 A | 3/1998 | Olnowich et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A | 10/1998 | Chikazawa et al. |
| 5,835,496 A | 11/1998 | Yeung et al. |
| 5,838,684 A | 11/1998 | Wicki et al. |
| 5,862,350 A | 1/1999 | Coulson |
| 5,864,555 A | 1/1999 | Mathur et al. |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,896,380 A | 4/1999 | Brown et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,011,910 A | 1/2000 | Chau et al. |
| 6,016,310 A | 1/2000 | Muller et al. |
| 6,023,471 A | 2/2000 | Haddock et al. |
| 6,031,843 A | 2/2000 | Swanbery et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendel et al. |
| 6,088,356 A | 7/2000 | Hendel et al. |
| 6,094,434 A | 7/2000 | Kotzur et al. |
| 6,104,696 A | 8/2000 | Kadambi et al. |
| 6,104,700 A | 8/2000 | Haddock et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,160,812 A | 12/2000 | Bauman et al. |
| 6,172,990 B1 | 1/2001 | Deb et al. |
| 6,178,520 B1 | 1/2001 | DeKoning et al. |
| 6,181,699 B1 | 1/2001 | Crinion et al. |
| 6,185,222 B1 | 2/2001 | Hughes |
| 6,195,335 B1 | 2/2001 | Calvignac et al. |
| 6,201,492 B1 | 3/2001 | Amar et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,324,651 B2 | 11/2001 | Kubik et al. |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,359,879 B1 | 3/2002 | Carvey et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,421,352 B1 | 7/2002 | Manaka et al. |
| 6,424,658 B1 | 7/2002 | Mathur |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,457,175 B1 | 9/2002 | Lerche |
| 6,459,705 B1 | 10/2002 | Cheng |
| 6,460,088 B1 | 10/2002 | Merchant |
| 6,463,063 B1 | 10/2002 | Bianchini, Jr. et al. |
| 6,466,608 B1 | 10/2002 | Hong et al. |
| 6,470,436 B1 | 10/2002 | Croft et al. |
| 6,473,428 B1 | 10/2002 | Nichols et al. |
| 6,473,433 B1 | 10/2002 | Bianchini, Jr. et al. |
| 6,477,174 B1 | 11/2002 | Dooley et al. |
| 6,480,477 B1 | 11/2002 | Treadaway et al. |
| 6,490,280 B1 | 12/2002 | Leung |
| 6,493,347 B2 | 12/2002 | Sindhu et al. |
| 6,496,502 B1 | 12/2002 | Fite et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa et al. |
| 6,535,504 B1 | 3/2003 | Johnson et al. |
| 6,549,519 B1 | 4/2003 | Michels et al. |
| 6,553,370 B1 | 4/2003 | Andreev et al. |
| 6,556,208 B1 | 4/2003 | Congdon et al. |
| 6,567,404 B1 | 5/2003 | Wilford |
| 6,570,884 B1 | 5/2003 | Connery et al. |
| 6,577,631 B1 | 6/2003 | Keenan et al. |
| 6,587,432 B1 | 7/2003 | Putzolu et al. |
| 6,591,302 B2 | 7/2003 | Boucher et al. |
| 6,601,186 B1 | 7/2003 | Fox et al. |
| 6,606,300 B1 | 8/2003 | Blanc et al. |
| 6,628,650 B1 | 9/2003 | Saite et al. |
| 6,629,099 B2 | 9/2003 | Cheng |
| 6,633,580 B1 | 10/2003 | Torudbakken et al. |
| 6,633,952 B2 | 10/2003 | Winograd et al. |

| Patent | Kind | Date | Inventor |
|---|---|---|---|
| 6,636,483 | B1 | 10/2003 | Pannell |
| 6,643,269 | B1 | 11/2003 | Fan et al. |
| 6,654,342 | B1 | 11/2003 | Dittia et al. |
| 6,654,346 | B1 | 11/2003 | Mahalingaiah et al. |
| 6,654,370 | B1 | 11/2003 | Quirke et al. |
| 6,654,373 | B1 | 11/2003 | Maher, III et al. |
| 6,654,862 | B2 | 11/2003 | Morris |
| 6,658,002 | B1 | 12/2003 | Ross et al. |
| 6,661,791 | B1 | 12/2003 | Brown |
| 6,671,275 | B1 | 12/2003 | Wong et al. |
| 6,678,248 | B1 | 1/2004 | Haddock et al. |
| 6,681,332 | B1 | 1/2004 | Byrne et al. |
| 6,683,872 | B1 | 1/2004 | Saito |
| 6,687,217 | B1 | 2/2004 | Chow et al. |
| 6,687,247 | B1 | 2/2004 | Wilford et al. |
| 6,691,202 | B2 | 2/2004 | Vasquez et al. |
| 6,696,917 | B1 | 2/2004 | Heitner et al. |
| 6,697,359 | B1 | 2/2004 | George |
| 6,697,368 | B2 | 2/2004 | Chang et al. |
| 6,700,894 | B1 | 3/2004 | Shung |
| 6,708,000 | B1 | 3/2004 | Nishi et al. |
| 6,721,229 | B1 | 4/2004 | Cole |
| 6,721,268 | B1 | 4/2004 | Ohira et al. |
| 6,721,313 | B1 | 4/2004 | Van Duyne |
| 6,721,338 | B1 | 4/2004 | Sato |
| 6,731,875 | B1 | 5/2004 | Kartalopoulos |
| 6,735,218 | B2 | 5/2004 | Chang et al. |
| 6,745,277 | B1 | 6/2004 | Lee et al. |
| 6,747,971 | B1 | 6/2004 | Hughes et al. |
| 6,751,224 | B1 | 6/2004 | Parruck et al. |
| 6,754,881 | B2 | 6/2004 | Kuhlmann et al. |
| 6,765,866 | B1 | 7/2004 | Wyatt |
| 6,775,706 | B1 | 8/2004 | Fukumoto et al. |
| 6,778,546 | B1 | 8/2004 | Epps et al. |
| 6,781,990 | B1 | 8/2004 | Puri et al. |
| 6,785,290 | B1 | 8/2004 | Fujisawa et al. |
| 6,785,793 | B2 | 8/2004 | Aboulenein et al. |
| 6,788,697 | B1 | 9/2004 | Aweya et al. |
| 6,792,484 | B1 | 9/2004 | Hook |
| 6,792,502 | B1 | 9/2004 | Pandya et al. |
| 6,798,740 | B1 | 9/2004 | Senevirathne et al. |
| 6,798,933 | B2 | 9/2004 | Steinberg |
| 6,804,220 | B2 | 10/2004 | Odenwalder et al. |
| 6,804,731 | B1 | 10/2004 | Chang et al. |
| 6,807,179 | B1 | 10/2004 | Kanuri et al. |
| 6,807,363 | B1 | 10/2004 | Abiko et al. |
| 6,810,038 | B1 | 10/2004 | Isoyama et al. |
| 6,810,046 | B2 | 10/2004 | Abbas et al. |
| 6,813,243 | B1 | 11/2004 | Epps et al. |
| 6,813,266 | B1 | 11/2004 | Chiang et al. |
| 6,816,467 | B1 | 11/2004 | Muller et al. |
| 6,829,682 | B2 | 12/2004 | Kirihata et al. |
| 6,831,923 | B1 | 12/2004 | Laor et al. |
| 6,831,932 | B1 | 12/2004 | Boyle et al. |
| 6,836,808 | B2 | 12/2004 | Bunce et al. |
| 6,836,855 | B2 | 12/2004 | Arndt |
| 6,839,346 | B1 | 1/2005 | Kametani |
| 6,839,349 | B2 | 1/2005 | Ambe et al. |
| 6,839,797 | B2 | 1/2005 | Calle et al. |
| 6,842,422 | B1 | 1/2005 | Bianchini |
| 6,842,791 | B2 | 1/2005 | Navada et al. |
| 6,854,117 | B1 | 2/2005 | Roberts |
| 6,856,600 | B1 | 2/2005 | Russell et al. |
| 6,859,438 | B2 | 2/2005 | Haddock et al. |
| 6,865,153 | B1 | 3/2005 | Hill et al. |
| 6,901,072 | B1 | 5/2005 | Wong |
| 6,906,936 | B1 | 6/2005 | James et al. |
| 6,912,637 | B1 | 6/2005 | Herbst |
| 6,920,154 | B1 | 7/2005 | Achler |
| 6,925,516 | B2 | 8/2005 | Struhsaker et al. |
| 6,934,305 | B1 | 8/2005 | Duschatko et al. |
| 6,937,606 | B2 | 8/2005 | Basso et al. |
| 6,944,731 | B2 | 9/2005 | Bouchard et al. |
| 6,946,948 | B2 | 9/2005 | McCormack et al. |
| 6,957,258 | B2 | 10/2005 | Maher, III et al. |
| 6,959,007 | B1 | 10/2005 | Vogel et al. |
| 6,961,340 | B2 | 11/2005 | Karlsson et al. |
| 6,963,578 | B2 | 11/2005 | Akahane et al. |
| 6,973,092 | B1 | 12/2005 | Zhou et al. |
| 6,975,599 | B1 | 12/2005 | Johnson et al. |
| 6,978,309 | B1 | 12/2005 | Dorbolo |
| 6,980,552 | B1 | 12/2005 | Belz et al. |
| 6,982,974 | B1 | 1/2006 | Saleh et al. |
| 6,990,102 | B1 | 1/2006 | Kaniz et al. |
| 6,993,032 | B1 | 1/2006 | Dammann et al. |
| 6,996,663 | B1 | 2/2006 | Marsteiner |
| 7,005,812 | B2 | 2/2006 | Mitchell |
| 7,009,968 | B2 | 3/2006 | Ambe et al. |
| 7,012,919 | B1 | 3/2006 | So et al. |
| 7,020,814 | B2 | 3/2006 | Ryle et al. |
| 7,023,797 | B2 | 4/2006 | Tagore-Brage |
| 7,046,619 | B2 | 5/2006 | Alagar et al. |
| 7,050,430 | B2 | 5/2006 | Kalkunte et al. |
| 7,061,942 | B2 | 6/2006 | Noronha, Jr. et al. |
| 7,080,238 | B2 | 7/2006 | Hoof et al. |
| 7,082,133 | B1 | 7/2006 | Lor et al. |
| 7,095,742 | B2 | 8/2006 | Kaganoi |
| 7,103,041 | B1 | 9/2006 | Speiser et al. |
| 7,120,744 | B2 | 10/2006 | Klein |
| 7,124,205 | B2 | 10/2006 | Craft et al. |
| 7,126,948 | B2 | 10/2006 | Gooch et al. |
| 7,126,956 | B2 | 10/2006 | Scholten |
| 7,130,903 | B2 | 10/2006 | Masuda et al. |
| 7,151,797 | B2 | 12/2006 | Limberg |
| 7,161,948 | B2 | 1/2007 | Sampath et al. |
| 7,167,471 | B2 | 1/2007 | Calvignac et al. |
| 7,171,487 | B2 | 1/2007 | Herkersdorf et al. |
| 7,176,911 | B1 | 2/2007 | Kidono et al. |
| 7,185,141 | B1 | 2/2007 | James et al. |
| 7,185,266 | B2 | 2/2007 | Blightman et al. |
| 7,187,687 | B1 | 3/2007 | Davis et al. |
| 7,190,696 | B1 | 3/2007 | Manur et al. |
| 7,191,277 | B2 | 3/2007 | Broyles |
| 7,191,468 | B2 | 3/2007 | Hanner |
| 7,193,997 | B2 | 3/2007 | Van Lunteren et al. |
| 7,203,194 | B2 | 4/2007 | Chang et al. |
| 7,206,283 | B2 | 4/2007 | Chang et al. |
| 7,210,003 | B2 | 4/2007 | Khanna et al. |
| 7,212,526 | B2 | 5/2007 | Kanetake |
| 7,212,529 | B2 | 5/2007 | Yamano |
| 7,212,536 | B2 | 5/2007 | Mackiewich et al. |
| 7,218,637 | B1 | 5/2007 | Best et al. |
| 7,219,293 | B2 | 5/2007 | Tsai et al. |
| 7,228,509 | B1 | 6/2007 | Dada et al. |
| 7,236,490 | B2 | 6/2007 | Chang et al. |
| 7,236,492 | B2 | 6/2007 | Davis et al. |
| 7,237,058 | B2 | 6/2007 | Srinivasan |
| 7,246,197 | B2 | 7/2007 | Rosenbluth et al. |
| 7,249,306 | B2 | 7/2007 | Chen |
| 7,266,117 | B1 | 9/2007 | Davis |
| 7,272,611 | B1 | 9/2007 | Cuppett et al. |
| 7,272,613 | B2 | 9/2007 | Sim et al. |
| 7,277,425 | B1 | 10/2007 | Sikdar |
| 7,283,547 | B1 | 10/2007 | Hook et al. |
| 7,286,534 | B2 | 10/2007 | Kloth |
| 7,295,557 | B2 | 11/2007 | Clayton et al. |
| 7,324,509 | B2 | 1/2008 | Ni |
| 7,342,874 | B2 | 3/2008 | Pegrum et al. |
| 7,346,706 | B2 | 3/2008 | Rezaaifar et al. |
| 7,349,403 | B2 | 3/2008 | Lee et al. |
| 7,355,970 | B2 | 4/2008 | Lor |
| 7,356,030 | B2 | 4/2008 | Chang et al. |
| 7,366,100 | B2 | 4/2008 | Anderson et al. |
| 7,379,458 | B2 | 5/2008 | Inoue et al. |
| 7,382,722 | B2 | 6/2008 | Brolin et al. |
| 7,391,741 | B2 | 6/2008 | Kang |
| 7,391,769 | B2 | 6/2008 | Rajkumar et al. |
| 7,403,536 | B2 | 7/2008 | Blanc |
| 7,424,666 | B2 | 9/2008 | Chandwani et al. |
| 7,428,693 | B2 | 9/2008 | Obuchi et al. |
| 7,443,856 | B2 | 10/2008 | Lodha et al. |
| 7,468,975 | B1 | 12/2008 | Davis |
| 7,478,167 | B2 | 1/2009 | Ould-Brahim et al. |
| 7,496,689 | B2 | 2/2009 | Sharp et al. |
| 7,499,395 | B2 | 3/2009 | Rahman et al. |
| 7,502,328 | B2 | 3/2009 | Lee et al. |
| 7,505,416 | B2 | 3/2009 | Gordy et al. |
| 7,505,458 | B2 | 3/2009 | Menon et al. |

| | | |
|---|---|---|
| 7,512,127 B2 | 3/2009 | Chang et al. |
| 7,518,998 B2 | 4/2009 | Sakamoto et al. |
| 7,549,042 B2 | 6/2009 | Glaum et al. |
| 7,557,689 B2 | 7/2009 | Seddigh et al. |
| 7,558,193 B2 | 7/2009 | Bradbury et al. |
| 7,558,268 B2 | 7/2009 | Wybenga et al. |
| 7,558,925 B2 | 7/2009 | Bouchard et al. |
| 7,561,590 B1 | 7/2009 | Walsh |
| 7,574,541 B2 | 8/2009 | Liav et al. |
| 7,580,417 B2 | 8/2009 | Ervin et al. |
| 7,586,919 B2 | 9/2009 | Willis |
| 7,596,139 B2 | 9/2009 | Patel et al. |
| 7,603,146 B2 | 10/2009 | Benveniste |
| 7,606,161 B2 | 10/2009 | Kalkunte et al. |
| 7,609,617 B2 | 10/2009 | Appanna et al. |
| 7,613,991 B1 | 11/2009 | Bain |
| 7,636,369 B2 | 12/2009 | Wong |
| 7,649,885 B1 | 1/2010 | Davis |
| 7,657,703 B1 | 2/2010 | Singh |
| 7,688,476 B2 | 3/2010 | Ng et al. |
| 7,719,980 B2 | 5/2010 | Lee et al. |
| 7,738,450 B1 | 6/2010 | Davis |
| 7,742,489 B2 | 6/2010 | Chinn et al. |
| 7,802,049 B2 | 9/2010 | Levy |
| 7,813,291 B2 | 10/2010 | Yoon et al. |
| 7,813,367 B2 | 10/2010 | Wong |
| 7,817,659 B2 | 10/2010 | Wong |
| 7,821,925 B2 | 10/2010 | Davies |
| 7,827,471 B2 | 11/2010 | Hasenplaugh et al. |
| 7,830,884 B2 | 11/2010 | Davis |
| 7,864,685 B2 | 1/2011 | Iwamoto |
| 7,903,654 B2 | 3/2011 | Bansal |
| 7,933,947 B2 | 4/2011 | Fleischer et al. |
| 7,953,922 B2 | 5/2011 | Singh |
| 7,953,923 B2 | 5/2011 | Singh |
| 8,014,278 B1 | 9/2011 | Subramanian et al. |
| 2001/0001879 A1 | 5/2001 | Kubik et al. |
| 2001/0007560 A1 | 7/2001 | Masuda et al. |
| 2001/0026551 A1 | 10/2001 | Horlin |
| 2001/0048785 A1 | 12/2001 | Steinberg |
| 2001/0053150 A1 | 12/2001 | Clear et al. |
| 2002/0001307 A1 | 1/2002 | Nguyen et al. |
| 2002/0040417 A1 | 4/2002 | Winograd et al. |
| 2002/0054594 A1 | 5/2002 | Hoof et al. |
| 2002/0054595 A1 | 5/2002 | Ambe et al. |
| 2002/0069294 A1 | 6/2002 | Herkersdorf et al. |
| 2002/0073073 A1 | 6/2002 | Cheng |
| 2002/0085499 A1 | 7/2002 | Toyoyama et al. |
| 2002/0087788 A1 | 7/2002 | Morris |
| 2002/0089937 A1 | 7/2002 | Venkatachary et al. |
| 2002/0091844 A1 | 7/2002 | Craft et al. |
| 2002/0091884 A1 | 7/2002 | Chang et al. |
| 2002/0126672 A1 | 9/2002 | Chow et al. |
| 2002/0131437 A1 | 9/2002 | Tagore-Brage |
| 2002/0141403 A1 | 10/2002 | Akahane et al. |
| 2002/0146013 A1 | 10/2002 | Karlsson et al. |
| 2002/0161967 A1 | 10/2002 | Kirihata et al. |
| 2002/0169786 A1 | 11/2002 | Richek |
| 2002/0191605 A1 | 12/2002 | Van Lunteren et al. |
| 2003/0009466 A1 | 1/2003 | Ta et al. |
| 2003/0012198 A1 | 1/2003 | Kaganoi |
| 2003/0043800 A1 | 3/2003 | Sonksen et al. |
| 2003/0043848 A1 | 3/2003 | Sonksen |
| 2003/0061459 A1 | 3/2003 | Aboulenein et al. |
| 2003/0074657 A1 | 4/2003 | Bramley, Jr. |
| 2003/0081608 A1 | 5/2003 | Barri et al. |
| 2003/0095548 A1 | 5/2003 | Yamano |
| 2003/0103499 A1 | 6/2003 | Davis et al. |
| 2003/0103500 A1 | 6/2003 | Menon et al. |
| 2003/0108052 A1 | 6/2003 | Inoue et al. |
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. |
| 2003/0152096 A1 | 8/2003 | Chapman |
| 2003/0156586 A1 | 8/2003 | Lee et al. |
| 2003/0159086 A1 | 8/2003 | Arndt |
| 2003/0165160 A1 | 9/2003 | Minami et al. |
| 2003/0169470 A1 | 9/2003 | Alagar et al. |
| 2003/0177221 A1 | 9/2003 | Ould-Brahim et al. |
| 2003/0198182 A1 | 10/2003 | Pegrum et al. |
| 2003/0200343 A1 | 10/2003 | Greenblat et al. |
| 2003/0214956 A1 | 11/2003 | Navada et al. |
| 2003/0223424 A1 | 12/2003 | Anderson et al. |
| 2003/0223466 A1 | 12/2003 | Noronha, Jr. et al. |
| 2003/0227943 A1 | 12/2003 | Hallman et al. |
| 2004/0022263 A1 | 2/2004 | Zhao et al. |
| 2004/0028060 A1 | 2/2004 | Kang |
| 2004/0054867 A1 | 3/2004 | Stravers et al. |
| 2004/0062245 A1 | 4/2004 | Sharp et al. |
| 2004/0062246 A1 | 4/2004 | Boucher et al. |
| 2004/0088469 A1 | 5/2004 | Levy |
| 2004/0128434 A1 | 7/2004 | Khanna et al. |
| 2004/0141504 A1 | 7/2004 | Blanc |
| 2004/0190547 A1 | 9/2004 | Gordy et al. |
| 2004/0208177 A1 | 10/2004 | Ogawa |
| 2004/0208181 A1 | 10/2004 | Clayton et al. |
| 2004/0223502 A1 | 11/2004 | Wybenga et al. |
| 2004/0235480 A1 | 11/2004 | Rezaaifar et al. |
| 2004/0264380 A1 | 12/2004 | Kalkunte et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0097432 A1 | 5/2005 | Obuchi et al. |
| 2005/0120122 A1 | 6/2005 | Farnham |
| 2005/0132132 A1 | 6/2005 | Rosenbluth et al. |
| 2005/0132179 A1 | 6/2005 | Glaum et al. |
| 2005/0138276 A1 | 6/2005 | Navada et al. |
| 2005/0152324 A1 | 7/2005 | Benveniste |
| 2005/0152335 A1 | 7/2005 | Lodha et al. |
| 2005/0169317 A1 | 8/2005 | Pruecklmayer |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura et al. |
| 2006/0050690 A1 | 3/2006 | Epps et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2007/0038798 A1 | 2/2007 | Bouchard et al. |
| 2007/0088974 A1 | 4/2007 | Chandwani et al. |
| 2007/0179909 A1 | 8/2007 | Channasagara |
| 2007/0208876 A1 | 9/2007 | Davis |
| 2007/0258475 A1 | 11/2007 | Chinn et al. |
| 2007/0288690 A1 | 12/2007 | Wang et al. |
| 2008/0031263 A1 | 2/2008 | Ervin et al. |
| 2008/0037544 A1 | 2/2008 | Yano et al. |
| 2008/0069125 A1 | 3/2008 | Reed et al. |
| 2008/0092020 A1 | 4/2008 | Hasenplaugh et al. |
| 2008/0095169 A1 | 4/2008 | Chandra et al. |
| 2008/0117075 A1 | 5/2008 | Seddigh et al. |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2009/0279423 A1 | 11/2009 | Suresh et al. |
| 2009/0279440 A1 | 11/2009 | Wong et al. |
| 2009/0279441 A1 | 11/2009 | Wong et al. |
| 2009/0279541 A1 | 11/2009 | Wong et al. |
| 2009/0279542 A1 | 11/2009 | Wong et al. |
| 2009/0279546 A1 | 11/2009 | Davis |
| 2009/0279549 A1 | 11/2009 | Ramanathan et al. |
| 2009/0279558 A1 | 11/2009 | Davis et al. |
| 2009/0279561 A1 | 11/2009 | Chang et al. |
| 2009/0282148 A1 | 11/2009 | Wong et al. |

| | | | |
|---|---|---|---|
| 2009/0282322 | A1 | 11/2009 | Wong et al. |
| 2009/0287952 | A1 | 11/2009 | Patel et al. |
| 2009/0290499 | A1 | 11/2009 | Patel et al. |
| 2010/0034215 | A1 | 2/2010 | Patel et al. |
| 2010/0046521 | A1 | 2/2010 | Wong |
| 2010/0061393 | A1 | 3/2010 | Wong |
| 2010/0100671 | A1 | 4/2010 | Singh |
| 2010/0135313 | A1 | 6/2010 | Davis |
| 2010/0161894 | A1 | 6/2010 | Singh |
| 2010/0246588 | A1 | 9/2010 | Davis |
| 2011/0002340 | A1 | 1/2011 | Davis |
| 2011/0044340 | A1 | 2/2011 | Bansal et al. |
| 2011/0069711 | A1 | 3/2011 | Jha et al. |

FOREIGN PATENT DOCUMENTS

| | | |
|---|---|---|
| JP | 2003/289359 A | 10/2003 |
| JP | 2004-537871 A | 12/2004 |
| WO | WO 01/84728 A1 | 11/2001 |
| WO | WO 02/41544 A3 | 5/2002 |

OTHER PUBLICATIONS

Shah et al., "Fast Incremental Updates on Ternary-CAMs for Routing Lookups and Packet Classification," pp. 1-9, at URL: http://www.hoti.org/archive/hoti8papers/018.pdf, Aug. 2000.

10 Gigabit Ethernet—Technology Overview White Paper, Sep. 2001, 16 pages.

10 Gigabit Ethernet, Interconnection with Wide Area Networks, Version 1.0, Mar. 2002, 5 pages.

ANSI/IEEE Standard 802.1D, 1998, 373 pages.

Belhadj et al., "Feasibility of a 100GE MAC," PowerPoint Presentation, IEEE Meeting, Nov. 13-15, 2006, 18 pages.

Braun et al., "Fast incremental CRC updates for IP over ATM networks," IEEE Workshop on High Performance Switching and Routing, 2001, 6 pages.

Degermark, et al., "Small Forwarding Tables for Fast Routing Lookups," ACM Computer Communications Review, Oct. 1997, pp. 3-14, vol. 27, No. 4.

Foundry Networks, "BigIron Architecture Technical Brief," Oct. 1998, 15 pages, version 1.0.

Foundry Networks, "BigIron Architecture Technical Brief," Oct. 1998, 15 pages, version 1.02.

Foundry Networks, "BigIron Architecture Technical Brief," Dec. 1998, 14 pages, version 1.03.

Foundry Networks, "BigIron Architecture Technical Brief," May 1999, 15 pages, version 2.0.

Foundry Networks, "BigIron Architecture Technical Brief," May 1999, 15 pages, Version 2.01.

Foundry Networks, "BigIron Architecture Technical Brief," Jul. 2001, 16 pages, Version 2.02.

Foundry Networks, "Next Generation Terabit System Architecture—The High Performance Revolution for 10 Gigabit Networks," Nov. 17, 2003, 27 pages.

Gigabit Ethernet Alliance—"Accelerating the Standard for Speed," Copyright 1999, 19 pages.

Kichorowsky, et al., "Mindspeed.TM. Switch Fabric Offers the Most Comprehensive Solution for Multi-Protocol Networking Equipment," Apr. 30, 2001, 3 pages.

Matsumoto, et al., "Switch Fabrics Touted At Interconnects Conference," Aug. 21, 2000, printed on Aug. 12, 2002, at URL: http://www.eetimes.com/story/OEG20000821S0011, 2 pages.

McAuley, et al., "Fast Routing Table Lookup Using CAMs," Proceedings of INFOCOM, Mar.-Apr. 1993, pp. 1382-1391.

Foundry Networks, "JetCore™ Based Chassis Systems—An Architecture Brief on NetIron, BigIron, and FastIron Systems," Jan. 17, 2003, 27 pages.

Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.

Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.

Mindspeed—A Conexant Business, "Switch Fabric Chipset—CX27300 iScale.TM.," Apr. 30, 2001, 2 pages.

Mindspeed—A Conexant Business, "17×17 3.2 Gbps Crosspoint Switch with Input Equalization—M21110," Feb. 1, 2001, 2 pages.

Newton, Newton's Telecom Dictionary, CMP Books, Mar. 2004, 20th Ed., p. 617.

Satran, et al., "Out of Order Incremental CRC Computation," IEEE Transactions on Computers, Sep. 2005, vol. 54, Issue 9, 11 pages.

Spurgeon, "Ethernet, The Definitive Guide," O'Reilly & Associates, Inc., Sebastapol, CA, Feb. 2000.

The Tolly Group, "Foundry Networks, Inc.—BigIron 4000, Layer 2 & Layer 3 Interoperability Evaluation," No. 199133, Oct. 1999, 4 pages.

The Tolly Group, "Foundry Networks, Inc.—BigIron 8000 Gigabit Ethernet Switching Router, Layer 2 & Layer 3 Performance Evaluation," No. 199111, May 1999, 4 pages.

International Search Report for Application No. PCT/US2001/043113, mailed Dec. 13, 2002, 2 pages.

Written Opinion of the International Searching Authority for Application No. PCT/US2001/043113, mailed May 1, 2003, 6 pages.

International Preliminary Examination Report for Application No. PCT/US2001/043113, mailed Nov. 6, 2003, 6 pages.

International Search Report for Application No. PCT/US03/08719, mailed Jun. 17, 2003. 1 page.

U.S. Appl. No. 12/883,073, Flexible Method for Processing Data Packets in a Network Routing System for Enhanced Efficiency and Monitoring Capability, filed Sep. 15, 2010, Davis.

U.S. Appl. No. 12/880,518, Method and Apparatus for Aggregating Input Data Streams, filed September 13, 2010, Wong.

U.S. Appl. No. 12/684,022, Provisioning Single or Multistage Networks Using Ethernet Service Instances (ESIs), filed Jan. 7, 2010, Jha et al.

U.S. Appl. No. 12/417,913, Backplane Interface Adapter With Error Control and Redundant Fabric, filed Apr. 3, 2009, Patel et al.

U.S. Appl. No. 12/198,710, Techniques for Selecting Paths and/or Trunk Ports for Forwarding Traffic Flows, filed Aug. 26, 2008, Zhang et al.

U.S. Appl. No. 12/198,697, Selection of Trunk Ports and Paths Using Rotation, filed Aug. 26, 2008, Hsu et al.

U.S. Appl. No. 11/724,965, filed Mar. 15, 2007, Chang et al.

U.S. Appl. No. 11/586,991, Hitless Management Failover, filed Oct. 25, 2006, Ramanathan et al.

U.S. Appl. No. 10/832,086, System and Method for Optimizing Router Lookup, filed Apr. 26, 2004, Wong.

U.S. Appl. No. 10/141,223, Apparatus & Method of Processing Packets Under the Gigabit Ethernet Protocol in a Communications Network, filed May 7, 2002, Veerabadran et al.

U.S. Appl. No. 10/140,753, Integrated Adapter for a Network Routing System With Enhanced Efficiency and Monitoring Capability, filed May 6, 2002, Davis et al.

U.S. Appl. No. 10/140,751, Method and Apparatus for Efficiently Processing Data Packets in a Computer Network, filed May 6, 2002, Davis.

Non-Final Office Action for U.S. Appl. No. 09/855,024. mailed Jun. 4, 2002, 10 pages.

Final Office Action for U.S. Appl. No. 09/855,024, mailed Jan. 15, 2003, 20 pages.

Advisory Action for U.S. Appl. No. 09/855,024, mailed May 2, 2003.

Notice of Allowance for U.S. Appl. No. 09/855,024, mailed Nov. 3, 2003.

Notice of Allowance for U.S. Appl. No. 09/855,024, mailed Dec. 15, 2003. 6 pages.

Non-Final Office Action for U.S. Appl. No. 10/810,301, mailed Mar. 17, 2005,11 pages.

Non-Final Office Action for U.S. Appl. No. 10/810,301, mailed Feb. 16, 2006, 12 pages.

Notice of Allowance for U.S. Appl. No. 10/810,301, mailed Jul. 28, 2006, 5 pages.

Notice of Allowance for U.S. Appl. No. 10/810,301, mailed Feb. 6, 2007, 9 pages.

Non-Final Office Action for U.S. Appl. No. 09/855,025, mailed Nov. 23, 2004, 17 pages.

Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 10/832,086, mailed Sep. 19, 2007, 12 pages.
Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non Final Office Action for U.S. Appl. No. 10/832,086, mailed Apr. 1, 2009, 17 pages.
Final Office Action for U.S. Appl. No. 10/832,086, mailed Sep. 29, 2009, 26 pages.
Non-Final Office Action for U.S. Appl. No. 11/586,991, mailed Oct. 2, 2008, 23 pages.
Non-Final Office Action for U.S. Appl. No. 11/646,845, mailed Oct. 4, 2010, 48 pages.
Non-Final Office Action for U.S. Appl. No. 11/831,950, mailed Aug. 18, 2009, 49 pages.
Final Office Action for U.S. Appl. No. 11/831,950, mailed Jan. 6, 2010, 21 pages.
Advisory Action for U.S. Appl. No. 11/831,950, mailed Mar. 4, 2010, 4 pages.
Non-Final Office Action for U.S. Appl. No. 11/953,742, mailed on Nov. 19, 2009, 51 pages.
Final Office Action for U.S. Appl. No. 11/953,742, mailed Jun. 14, 2010, 21 pages.
Non-Final Office Action for U.S. Appl. No. 11/953,743, mailed Nov. 23, 2009, 47 pages.
Final Office Action for U.S. Appl. No. 11/953,743, mailed Jul. 15, 2010, 21 pages.
Non-Final Office Action for U.S. Appl. No. 11/953,745, mailed Nov. 24, 2009, 48 pages.
Non-Final Office Action for U.S. Appl. No. 11/953,745, mailed Jun. 14, 2010, 19 pages.
Non-Final Office Action for U.S. Appl. No. 11/953,751, mailed Nov. 16, 2009, 55 pages.
Final Office Action for U.S. Appl. No. 11/953,751, mailed Jun. 25, 2010, 24 pages.
Non-Final Office Action for U.S. Appl. No. 11/779,778, mailed Feb. 2, 2011, 63 pages.
Non-Final Office Action for U.S. Appl. No. 11/779,714, mailed Sep. 1, 2009, 58 pages.
Non-Final Office Action for U.S. Appl. No. 11/779,714, mailed Mar. 31, 2010, 26 pages.
Final Office Action for U.S. Appl. No. 11/779,714, mailed Nov. 9, 2010, 24 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Non-Final Office Action for U.S. Appl. No. 10/810,208, mailed Aug. 24, 2009, 38 pages.
Non-Final Office Action for U.S. Appl. No. 10/810,208, mailed Feb. 5, 2010, 13 pages.
Notice of Allowance for U.S. Appl. No. 10/810,208, mailed Jul. 15, 2010, 15 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/668,322, mailed Mar. 23, 2009, 19 pages.
Requirement for Restriction/Election for U.S. Appl. No. 11/668,322, mailed Oct. 29, 2009, 6 pages.
Final Office Action for U.S. Appl. No. 11/668,322, mailed Feb. 24, 2010, 33 pages.
Non-Final Office Action for U.S. Appl. No. 11/668,322, mailed Jun. 22, 2010, 16 pages.
Final Office Action for U.S. Appl. No. 11/668,322, mailed Feb. 1, 2011, 17 pages.
Non-Final Office Action for U.S. Appl. No. 11/854,486, mailed Jul. 20, 2009, 29 pages.
Non-Final Office Action for U.S. Appl. No. 11/854,486, mailed Jan. 12, 2010, 23 pages.
Notice of Allowance for U.S. Appl. No. 11/854,486, mailed Jul. 13, 2010, 12 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Notice of Allowance for U.S. Appl. No. 10/139,912, mailed Oct. 19, 2009, 17 pages.

Supplemental Notice of Allowance for U.S Appl. No. 10/139,912, mailed Nov. 23, 2009, 4 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Final Office Action for U.S. Appl. No. 10/140,751, mailed Mar. 17, 2009, 17 pages.
Advisory Action for U.S. Appl. No. 10/140,751, mailed Jun. 1, 2009, 3 pages.
Non-Final Office Action for U.S. Appl. No. 10/140,751, mailed Sep. 28, 2009, 34 pages.
Final Office Action for U.S. Appl. No. 10/140,751, mailed Mar. 25, 2010, 29 pages.
Non-Final Office Action for U.S. Appl. No. 10/140,751, mailed Dec. 20, 2010, 23 pages.
Non-Final Office Action for U.S. Appl. No. 11/745,008, mailed May 14, 2009, 27 pages.
Final Office Action for U.S. Appl. No. 11/745,008, mailed Dec. 30, 2009, 27 pages.
Advisory Action for U.S. Appl. No. 11/745,008, mailed Apr. 21, 2010, 8 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Notice of Allowance for U.S. Appl. No. 11/828,246, mailed Nov. 16, 2009, 20 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 11/621,038, mailed Apr. 23, 2009, 44 pages.
Final Office Action for U.S. Appl. No. 11/621,038, mailed Dec. 23, 2009, 27 pages.
Notice of Allowance for U.S. Appl. No. 11/621,038, mailed Apr. 28, 2010, 15 pages.
Non-Final Office Action for U.S. Appl. No. 12/795,492, mailed Mar. 17, 2011, 51 pages.
Non-Final Office Action for U.S. Appl. No. 12/198,697, mailed Feb. 2, 2010, 50 pages.
Final Office Action for U.S. Appl. No. 12/198,697, mailed Aug. 2, 2010, 55 pages.
Non-Final Office Action for U.S. Appl. No. 12/198,697, mailed Oct. 25, 2010, 36 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Final Office Action for U.S. Appl. No. 10/140,749, mailed Jan. 13, 2010, 44 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Non-Final Office Action for U.S. Appl. No. 12/198,710, mailed Sep. 28, 2010, 15 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Notice of Allowance for U.S. Appl. No. 11/000,359, mailed Sep. 22, 2009, 17 pages.
Requirement for Restriction/Election for U.S. Appl. No. 11/118,697, mailed Jun. 2, 2009, 8 pages.
Notice of Allowance for U.S. Appl. No. 11/118,697, mailed Sep. 30, 2009, 41 pages.
Requirement for Restriction/Election for U.S. Appl. No. 12/639,749, mailed Dec. 7, 2010, 3 pages.
Notice of Allowance for U.S. Appl. No. 12/639,749, mailed Feb. 11, 2011, 51 pages.
Non-Final Office Action for U.S. Appl. No. 12/639,762, mailed Sep. 1, 2010, 40 pages.
Notice of Allowance for U.S. Appl. No. 12/639,762, mailed Mar. 4, 2011, 7 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.

Notice of Allowance for U.S. Appl. No. 09/988,066, mailed Jan. 9, 2009.
Non Final Office Action U.S. Appl. No. 11/804,977, mailed Jan. 14, 2008, 13 pages.
Notice of Allowance for U.S. Appl. No. 11/804,977, mailed Nov. 19, 2008, 17 pages.
Non-Final Office Action for U.S. Appl. No. 12/400,594, mailed May 14, 2010, 53 pages.
Final Office Action for U.S. Appl. No. 12/400,594, mailed Oct. 28, 2010, 13 pages.
Non-Final Office for U.S. Appl. No. 12/400,645, mailed Sep. 1, 2010, 45 pages.
Notice of Allowance for U.S. Appl. No. 12/400,645, mailed Jan. 26, 2011, 14 pages.
Non-Final Office Action for U.S. Appl. No. 12/372,390, mailed Apr. 22, 2010, 46 pages.
Non-Final Office Action for U.S. Appl. No. 12/372,390, mailed Sep. 13, 2010, 10 pages.
Notice of Allowance for U.S. Appl. No. 12/372,390, mailed Mar. 9, 2011, 8 pages.
Non-Final Office Action for U.S. Appl. No. 12/505,390, mailed Oct. 28, 2010, 51 pages.
Non-Final Office Action for U.S. Appl. No. 09/855,015, mailed Oct. 28, 2004, 12 pages.
Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
Non-Final Office Action for U.S. Appl. No. 12/070,893, mailed Jun. 10, 2010, 44 pages.
Final Office Action for U.S. Appl. No. 12/070,893, mailed Nov. 24, 2010, 11 pages.
Non-Final Office Action for U.S. Appl. No. 12/070,893, mailed Mar. 18, 2011, 7 pages.
Non-Final Office Action for U.S. Appl. No. 11/611,067, mailed Feb. 20, 2009, 11 pages.
Final Office Action for U.S. Appl. No. 11/611,067, mailed Oct. 16, 2009, 35 pages.
Non-Final Office Action for U.S. Appl. No. 11/611,067, mailed Dec. 8, 2009, 11 pages.
Non-Final Office Action for U.S. Appl. No. 11/615,769, mailed Apr. 15, 2009, 11 pages.
Final Office Action for U.S. Appl. No. 11/615,769, mailed Jan. 22, 2010, 34 pages.
Advisory Action for U.S. Appl. No. 11/615,769, mailed May 25, 2010, 3 pages.
Notice of Allowance for U.S. Appl. No. 11/615,769, mailed Jul. 12, 2010, 14 pages.
Final Office Action for U.S. Appl. No. 11/646,845, mailed on Jun. 9, 2011, 22 pages.
Non-Final Office Action for U.S. Appl. No. 11/953,742, mailed on Mar. 30, 2011, 23 pages.
Notice of Allowance for U.S. Appl. No. 11/953,743, mailed on Apr. 28, 2011, 19 pages.
Non-Final Office Action for U.S. Appl. No. 11/953,751, mailed on Mar. 29, 2011, 29 pages.
Final Office Action for U.S. Appl. No. 10/140,751, mailed on Jun. 28, 2011, 23 pages.
Non-Final Office Action for U.S. Appl. No. 12/702,031, mailed on Apr. 29, 2011, 5 pages.
Non-Final Office Action for U.S. Appl. No. 12/198,697, mailed on May 20, 2011, 43 pages.
Non-Final Office Action for U.S. Appl. No. 12/198,710, mailed on Mar. 24, 2011, 40 pages.
Notice of Allowance for U.S. Appl. No. 12/400,594, mailed on Mar. 23, 2011, 11 pages.
Non-Final Office Action for U.S. Appl. No. 11/646,845, mailed on Oct. 14, 2011, 19 pages.
Non-Final Office Action for U.S. Appl. No. 11/831,950, mailed on Aug. 26, 2011, 45 pages.
Final Office Action for U.S. Appl. No. 11/953,742, mailed on Oct. 26, 2011, 19 pages.
Non-Final Office Action for U.S. Appl. No. 11/668,322, mailed on Aug. 30, 2011, 17 pages.
Non-Final Office Action for U.S. Appl. No. 11/745,008, mailed on Sep. 14, 2011, 26 pages.
Notice of Allowance for U.S. Appl. No. 12/795,492, mailed on Nov. 14, 2011, 10 pages.
Final Office Action for U.S. Appl. No. 12/198,710, mailed on Oct. 19, 2011, 58 pages.
Final Office Action for U.S. Appl. No. 12/070,893, mailed on Sep. 21, 2011, 12 pages.

X: used entry

BINARY TREE 605

TCAM MANAGEMENT APPROACH THAT MINIMIZE MOVEMENTS

BACKGROUND OF THE INVENTION

A routing device, such as a router, typically routes a received packet based upon the packet's destination address, which may be a 32 bit number (displayed as A.B.C.D such as 192.168.2.1) in internet protocol version 4 (IPv4), or a 128 bit number in internet protocol version 6 (IPv6). The routing device is generally configured to use a packet's destination internet protocol (IP) address (which may be stored in the packet's header) to perform a lookup in the device's routing table and then forward the packet based upon the results of the lookup.

An entry in a router's routing table is typically of the form (prefix, forwarding_info), where prefix is an address (such as an IP address) or a prefix representing a range of addresses and forwarding info can indicate the action to be taken on the packet having the corresponding prefix. For example, in IPv4 the prefix may represent an IP address in the form A.B.C.D (e.g., 192.168.2.1). Alternatively, the prefix may also represent a range of addresses such as 103.23.3.0/24, where 24 is the length of the prefix and the last 8 bits are wildcards (this represents a range of 256 addresses from 103.23.3.0 through 103.23.3.255).

A packet's destination address could match multiple routes. For example, destination 192.168.2.1 matches routes 192.0.0.0/8, 192.168.0.0/16 and 192.168.2.0/24. Typically, in such a scenario, the longest match (e.g., 192.168.2.0/24) is selected and corresponding action taken.

The forwarding information associated with a prefix in a routing table entry indicates an action to be taken for a packet whose destination address matches the prefix. The action may for example be related to how the packet is to be forwarded. For example, the forwarding information may indicate a port of the router to which the packet is to be forwarded, the next hop device to which the packet is to be forwarded, and other like information.

Ternary content-addressable memories (TCAMs) are now commonly used for storing routing table information in routers. A TCAM is a special type of fully associative memory capable of storing multiple entries and that allows fully parallel search of its contents. A TCAM is thus well suited for handling IP addresses described above. In other words, a TCAM receives a data word, as an input and uses that data word to return one or more storage addresses where the word can be found. Each entry of a TCAM typically has a prefix entry and an action entry. The input data can be compared with all the TCAM prefix entries in parallel. If there are multiple matches, an action associated with longest matched entry is performed. The "action" can be sending the packet to a particular port, dropping the packet, etc.

To facilitate the parallel matching process, the entries in a TCAM are generally organized to facilitate parallel matching and identification of the longest match. For example, for a routing table, the entries in a TCAM are stored in order of decreasing prefix lengths. As a result of such an arrangement, when there are multiple matches, the first entry among the matched entries (i.e., the lowest numbered matched entry) represents the longest match and is thus selected. However, due to the need for the decreasing prefix length arrangement, making updates to the TCAM becomes a non-trivial process that requires movement of several TCAM entries. For example, adding a new entry to the TCAM (e.g., adding a new prefix to the routing table) requires several TCAM movements to find an empty TCAM entry for storing the new value while still maintaining the decreasing prefix length order of the TCAM. Such movements are very time consuming and lower the throughput of the TCAM. In a router, this can even lead to an interruption in packet switching.

Accordingly, various techniques are presently used to improve the efficiency of TCAM updates. For example, in some techniques TCAM entries are intentionally left unused for receiving new additions. However, this technique can lead to wastage of memory and increase the cost of using a TCAM. For example, some existing TCAM management methods either partition TCAM entries into multiple regions, or require the existence of a contiguous free region to hold all of the free TCAM entries. As such, these existing methods involve many movements of free TCAM entries from region to region to satisfy the ordering restriction. In one such approach, a TCAM is divided into 32 regions or partitions for IPv4, where each region includes used prefix entries of the same length (or many more regions for IPv6) as well as unused entries. A TCAM entry of a specified prefix length must be obtained from a partition with that length.

In this example, if a partition runs out of free TCAM entries, then other TCAM entries are either pushed up or down to obtain a free or unused entry. For example, if partition 16 has no free entry, and the closest free entry is in partition 25, this approach must create a free or unused entry in partition 16 by moving a TCAM entry from 24 to 25, 23 to 24, and so on until 16 to 17 is moved. As is evident, this approach could potentially involve many TCAM entry movements resulting in a lot of time needed for TCAM updates. The problem is further aggravated for IP addresses have more prefixes, such as in IPv6.

Another conventional TCAM management technique used in routing devices assumes that internet routes have a statistical maximum binary tree height of 4. This technique thus divides the TCAM into 4 regions, instead of 32 regions. With this approach the number of movements needed when pushing entries up or down is reduced to a maximum of three. However, this technique assumes that the region in which entry is to be added is known ahead of time in order to put it into the correct region to avoid movements. Also, with this technique, several TCAM movements are needed if the binary tree height changes or any region runs out of space. Another problem with this technique is that it will not work if the maximum height of routes exceeds the predefined number of regions. For example, if an internet site advertises its routing binary tree height of 5 or more, then a 4 region TCAM management approach will not work.

Therefore, efficient TCAM management techniques, which can be used in network devices such as routers and that have minimal, if any, impact on the processing of the network device, are desired.

BRIEF SUMMARY OF THE INVENTION

Embodiments of the present invention provide techniques for efficiently managing TCAMs by minimizing TCAM movements needed for updating a TCAM while making efficient use of the TCAM memory.

According to an embodiment of the present invention a method includes forming a chain of nodes, wherein the nodes have an order and each node is identified with a ternary content-addressable memory (TCAM) entry. The method also includes determining a location in the TCAM where a prefix is to be inserted, identifying a first node that is nearest to the location and either higher or lower than the location, and identifying a free TCAM entry that is nearest to the location. The method further includes moving the TCAM entry identified as a node to the nearest free TCAM entry, freeing the first node, and inserting the prefix in the first node. Moving the TCAM entry identified as a node to the nearest free TCAM entry can be copying the contents of the TCAM entry corresponding to the node in the nearest free TCAM entry and deleting or not deleting the copied contents in the TCAM entry corresponding to the node after it is copied into the nearest free TCAM entry. Freeing the first node can mean identifying the first node for inserting a new prefix into the node without deleting the contents of the first node or with deleting the contents of the first node. If the contents of the first node are deleted, then the prefix can be written into the TCAM entry associated with the first node. If the contents of the first node are not deleted, then the TCAM entry associated with the first node is overwritten with the prefix. In this method, moving the TCAM entry identified as the node to the free TCAM entry and freeing the first node or the second node preserves the order of nodes in the chain of nodes. If the free TCAM entry is between two nodes that are separated from the first node or second node by multiple nodes in the chain then multiple moves of the TCAM entries identified as nodes will be required to preserve the order of nodes in the chain of nodes.

According to another embodiment of the present invention a method includes forming a chain of nodes, wherein the nodes have an order and each node is identified with a ternary content-addressable memory (TCAM) entry. The method also includes determining a range of TCAM entries where a new entry is to be inserted. The range is specified by a first TCAM entry identified as a first node and a second TCAM entry identified as a second node. The first node and the second node are adjacent in the chain of nodes. The method also includes determining a location of a free TCAM entry that is nearest to where the new entry is to be inserted. Upon determining that the location of the free TCAM entry is within the range, inserting the new entry in the free TCAM entry. Upon determining that the location of the free TCAM entry is not within the range, moving the TCAM entry identified as a node to the free TCAM entry, freeing either the first node or the second node, and inserting the new entry in the TCAM entry identified as either the freed first node or the freed second node. Freeing a node adjusts the pointers of its parent and children. In this method, moving the TCAM entry identified as either the freed first node or the freed second node to the free TCAM entry and freeing the first node or the second node preserves the order of nodes in the chain of nodes. If the free TCAM entry is between two TCAM entries identified as nodes that are separated from the first node or second node by multiple nodes in the chain then multiple moves of the TCAM entries identified as nodes will be required to preserve the order of nodes in the chain of nodes.

According to another embodiment of the present invention a method of adding new entries in a TCAM, wherein the new entries have a prefix, includes determining a first node and a second node identified as TCAM entries, determining if there is a free TCAM entry between the first TCAM entry identified as the first node and the second TCAM entry identified as the second node, and storing a new entry in the free TCAM entry. Upon determining that a free TCAM entry does not exist between the first TCAM entry identified as the first node and the second TCAM entry identified as the second node, further determining a chain of nodes and then determining if there is a free TCAM entry in the TCAM entries identified as the chain of nodes. Upon determining that there is a free TCAM entry within the TCAM entries identified as the chain of nodes, moving the TCAM entries identified as the nodes in the chain of nodes to generate a free node nearest to the prefix and inserting the prefix in the TCAM entry identified as the free node. Moving the TCAM entries identified as the nodes in the chain of nodes preserves the order of the nodes. The first node can be the nearest higher node to the prefix and the second node can be the nearest lower node to the prefix. The chain of nodes can include all ancestors of the first node and all descendents of the second node.

In one embodiment, moving the TCAM entries identified as the nodes can include shifting the TCAM entries identified as nodes so that a first TCAM entry identified as a first node occupies the free TCAM entry and making the first node a free node. In another embodiment, moving the TCAM entries identified as the nodes can include shifting the TCAM entries identified as nodes so that a third TCAM entry identified as a third node occupies the free TCAM entry, the second TCAM entry identified as a second node occupies the third TCAM entry identified as a the third node and making the first node a free node. In yet another embodiment, moving the TCAM entries identified as the nodes can include shifting the TCAM entries identified as the nodes so that a fourth TCAM entry identified as a fourth node occupies the free TCAM entry, a third TCAM entry identified as a third node occupies the fourth TCAM entry identified as the fourth node, the second TCAM entry identified as the second node occupies the third TCAM entry identified as the third node, and making the first TCAM entry identified as the third node, and making the first node a free node.

In yet another embodiment, the method can include determining if there is a free TCAM entry in the descendents portion of the chain of nodes upon determining that there is not a free TCAM entry within the chain of nodes, moving the TCAM entries identified as the nodes in the descendents portion of the chain of nodes to generate a free TCAM entry identified as a free node nearest to the prefix upon determining that there is a free TCAM entry within the descendents portion of the chain of nodes, and inserting the prefix in the free node. Another embodiment can further include determining if there is a free TCAM entry in the ancestors portion of the chain of nodes, upon determining that there is not a free TCAM entry within the descendents portion of the chain of nodes, moving the TCAM entries identified as the nodes in the ancestors portion of the chain of nodes to generate a free TCAM entry identified as a free node nearest to the prefix upon determining that there is a free TCAM entry within the ancestors portion of the chain of nodes, and inserting the prefix in the free node. Alternatively, an embodiment can include looking at the ancestor portion of the chain before the descendent portion of the chain.

In yet another embodiment, a node of the chain is deleted by marking a TCAM entry identified as the node as a free entry.

According to another embodiment, a method of adding a new entry in a TCAM includes identifying a specified range of the new entry, searching for a node range that overlaps the specified range, wherein the searching begins at a root node. If it is determined that the node range overlaps the specified range in an overlapping region, selecting a TCAM entry in the overlapping region that is closest to a predetermined preference of the specified range. If it is determined that the selected TCAM entry is at a start or an end of the node range, adjusting the node range to make a free TCAM entry. If it is determined that the free TCAM entry is not at the start or the end of the node range, breaking a node in the node range into two nodes and adding a new node which is a free TCAM entry. The new entry is then added into the free TCAM entry. The new entry includes a prefix.

In yet another embodiment, the predetermined preference of the specified range is the start of specified range.

In yet another embodiment, the predetermined preference of the specified range is the end of specified range.

In yet another embodiment, the method further includes upon determining that the node range has only one entry, removing the one node entry from the tree.

In yet another embodiment, the step of adjusting the node range further includes making the node range larger to incorporate additional nodes.

In yet another embodiment, the method further includes upon determining that a node range of an identified node does not overlap the specified range, next determining if a child node of the identified node overlaps the specified range.

According to another embodiment, a method of adding a new entry with a specified range and a start of a specified range in a TCAM includes searching a plurality of nodes for the smallest node having a range start that is larger than the start of a specified range, and removing the smallest node having a range start that is larger than the start of a specified range. The searching can be done in descending order starting from the node having a range start that is larger than the start of a specified range and is closest to the start of the specified range. The plurality of nodes can each be arranged to have a contiguous range of free entries.

According to another embodiment, a method of adding a new entry with a specified range and a start of a specified range in a TCAM includes searching a plurality of nodes for a target node having a target node range that overlaps the specified range, removing a start of the target node range upon locating the target node, and adjusting the target node range after the start of the target node range has been removed. The plurality of nodes can each be arranged to have a contiguous range of free entries. The searching can be done in descending order starting from the node having a range start that is larger than the start of a specified range and is closest to the start of the specified range.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of the invention may be realized by reference to the remaining portions of the specification and the drawings, presented below. The Figures are incorporated into the detailed description portion of the invention.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention may be implemented in hardware, software, or combinations thereof. Components of the present invention may be incorporated as standalone systems that are configured to handle information for processing with the use of a TCAM. Components of the present invention may also be incorporated into one or more system or systems (which may be distributed) enabling the system or systems to receive and handle information received from a network for processing with the use of a TCAM. For example, an embodiment of the present invention may be incorporated into a network device such as a switch or router, thereby enabling the network device to receive and process IP addresses with the use of a TCAM.

Embodiments of the present invention provide techniques for efficiently managing TCAMs by minimizing TCAM movements needed for updating a TCAM. In embodiments, the free TCAM entries are not restricted to specific regions of the TCAM, but rather, free TCAM entries can be anywhere, provided the free TCAM entries' routing table ancestors and descendents are in order, as is explained below with reference to the figures.

Figure 1A:
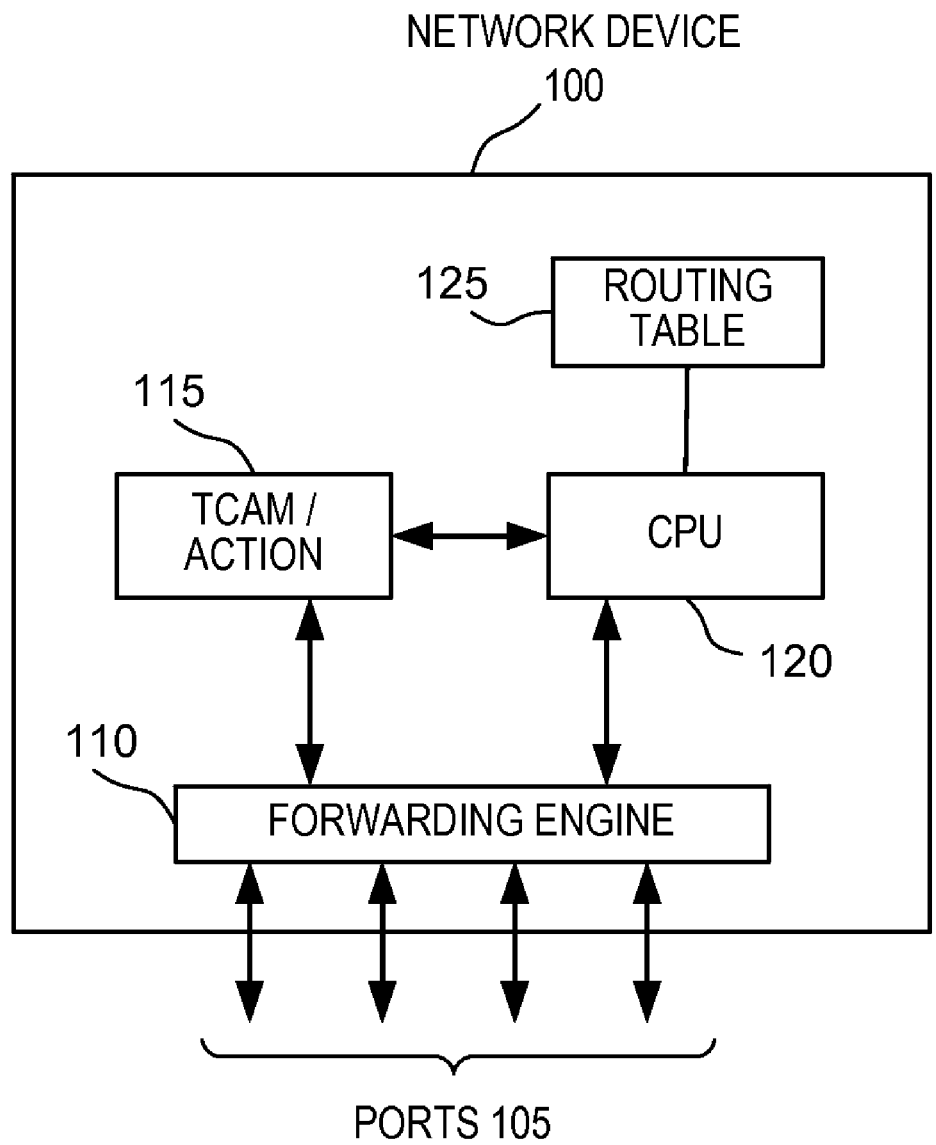
FIG. 1A is a block diagram of a router that can incorporate an embodiment of the invention.

FIG. 1A depicts a simplified block diagram of a network device 100 that may incorporate an embodiment of the present invention. In the embodiment depicted in FIG. 1A, network device 100 includes a plurality of ports 105, a forwarding engine 110, a ternary content-addressable memory (TCAM) 115, a central processing unit (CPU) 120, and a routing table 125. The components of network device 100 depicted in FIG. 1A are meant for illustrative purposes only and are not intended to limit the scope of the invention in any manner. Alternative embodiments may have more or less components. For example, while only one forwarding engine 110, one TCAM 115, one CPU 120, and one routing table 125 is depicted in FIG. 1A, alternative embodiments may have multiple forwarding engines, TCAMs, CPUs, and routing tables.

Network device 100 receives and transmits packets using ports 105. A port within ports 105 may be classified as an input port or an output port depending upon whether a packet is received or transmitted using the port. A port over which a packet is received by network device 100 is referred to as an input port. A port used for communicating or transmitting a packet from network device 100 is referred to as an output port. A particular port may function both as an input port and an output port. Ports 105 may be capable of receiving and/or transmitting different types of data traffic at different speeds including 1 Gigabit/sec, 10 Gigabits/sec, or more.

In one embodiment, network device 100 may receive one or more packets via one or more input ports. For a packet received over an input port, network device 100 may be configured to determine an output port for the incoming packet. The incoming packet may then be forwarded to the determined output port and transmitted from network device 100 using the output port. As part of the processing to determine an output port for an incoming packet, network device 100 may be configured to select a particular path from multiple paths that may be available for forwarding the incoming packet and select an output port corresponding to the particular selected path.

In the embodiment depicted in FIG. 1A, ports 105 are coupled to a forwarding engine 110. Incoming packets received by network device 100 via one or more ports 105 may be sent to forwarding engine 110, which parses the information in the header of the incoming packet. Forwarding engine 110 is configured to process each incoming packet received by network device 100 and determine how the packet is to be forwarded. This processing may involve performing lookups in TCAM 115 or other storage locations. In one embodiment, as part of the processing, forwarding engine 110 is configured to determine an output port to which the incoming packet is to be forwarded. As part of determining an output port to which the incoming packet is to be forwarded, forwarding engine 110 is configured to select a particular path from multiple paths for forwarding the incoming packet and then select an output port corresponding to a particular selected path. In one embodiment, forwarding engine 110 is configured to extract one or more sections of the incoming packet to be forwarded. Forwarding engine 110 is then configured to generate a result using the extracted sections of the incoming packet and one or more functions. A portion of the generated result is used as an index (path index) for selecting a path from multiple possible paths for forwarding the packet.

TCAM 115 includes a TCAM entry, which can correspond to the prefix of the incoming packet, and an action entry, which provides information on how to process an incoming packet having a prefix that matches the TCAM entry. The action entry in the TCAM 115 includes information regarding how to process the incoming packet such as where to forward the incoming packet, whether the incoming packet should be dropped, etc. Therefore, if an incoming packet has a prefix that matches a TCAM entry, then the TCAM will provide handling information for the incoming packet in its TCAM action entry. However, if an incoming packet is parsed in the forwarding engine 110, but there is no corresponding TCAM entry in TCAM 115, then the incoming packets prefix can be 1) sent to the CPU 120 for further processing, 2) dropped, or 3) forwarded to a default route depending on the user configuration. An example of a TCAM is provided in Table 1.

TABLE 1

| ENTRY | ACTION ENTRY |
|---|---|
| 104.18.6.2 | DROP |
| 104.18.0.0/16 | 173.4.1.2 |
| 102.22.2.6 | 169.3.6.12 |
| 102.22.0.0/16 | 169.3.6.8 |
| 102.0.0.0/24 | 169.3.6.4 |

In Table 1 the TCAM entries in the left column identify a prefix or a range of prefixes associated with an action entry in the right column. If an incoming packet has a prefix which is 104.18.6.2 then the TCAM will provide information to the forwarding engine to drop the incoming packet and not process that incoming packet. If an incoming packet has a prefix which is 104.18.7.1 then the TCAM will associate this prefix with 104.18.0.0/16 and provide information to the forwarding engine to forward that incoming packet to the address 173.4.1.2. If an incoming packet has a prefix which is 102.22.2.6 then the TCAM will provide information to the forwarding engine to forward that incoming packet to the address 169.3.6.12. If an incoming packet has a prefix which is 102.22.3.2 then the TCAM will provide information to the forwarding engine to forward that incoming packet to the address 169.3.6.8. If an incoming packet has a prefix which is 102.8.2.2 then the TCAM will provide information to the forwarding engine to forward that incoming packet to the address 169.3.6.4.

TCAMs are installed from routing tables during route learning. Route learning can include configuring static routes or using Layer 3 (L3) routing protocols such as Routing Information Protocol (RIP), Open Shortest Path First (OSPF) or Border Gateway Protocol (BGP) to learn routes from other devices. A route consists of a prefix and an action. A TCAM entry is installed corresponding to a route. In addition to installing TCAM routes, a default TCAM of 0.0.0.0/0 (where all 32 bits are wild cards and match any destination address) at the highest numbered index (lowest priority) of the TCAM, can also be installed. Having a default TCAM ensures that all input packets will match at least one TCAM (i.e. any input packet not matching another TCAM will still match this default TCAM). If a packet matches the default TCAM and another TCAM, the other TCAM's action will be used because the other TCAM has lower index. The default TCAM action can be configured to drop packets or forward packets to a default destination. Thus, packets not matching other TCAM will not go to CPU 120 and therefore not overload the CPU 120.

Figure 1B:
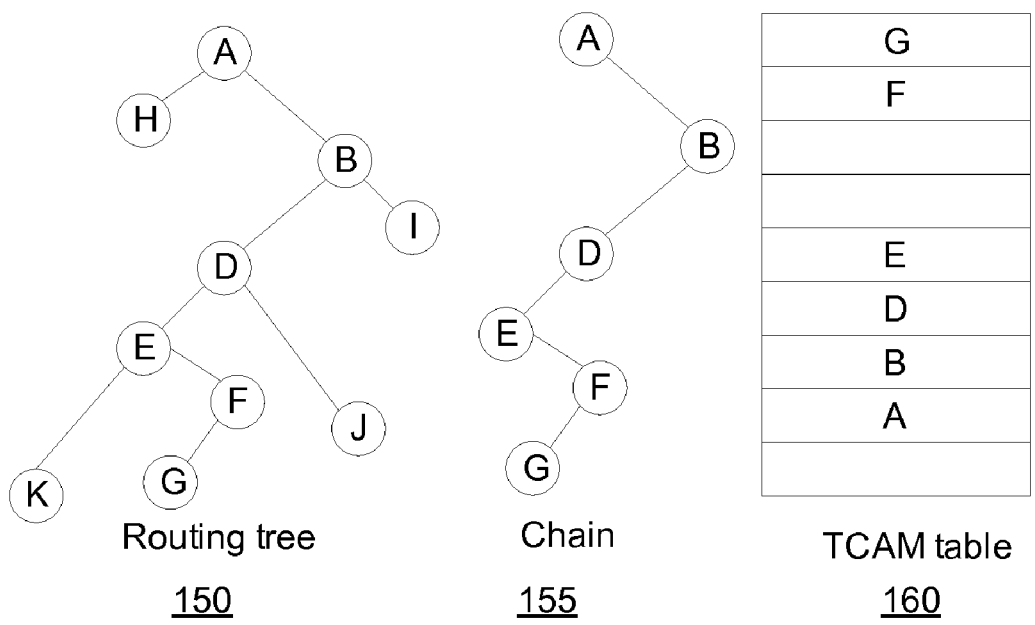
FIG. 1B is a block diagram illustrating the relationship of information as organized in a binary tree, chain and TCAM table.

Before the new TCAM entry can be inserted into the TCAM 115, the CPU 120 determines where in the TCAM 115 the new TCAM entry is to be inserted so that the longest match TCAM entries always has lowest indexes. The routing table 125 is used to determine where the new TCAM entry is to be inserted in the TCAM 115. The routing table 125 also stores a binary tree of TCAM entries as illustrated in FIG. 1B and as further explained below with reference to FIG. 1B. The CPU 120 uses the location of the nodes in the binary tree to determine the optimal location in the TCAM 115 to enter the new TCAM entry. After the CPU 120 determines the correct location in the TCAM to store the new TCAM entry, the new TCAM entry is stored in the TCAM 115. If there is a free space available in the TCAM 115, at the location determined by the CPU 120, then the TCAM is stored at that location. However, if there isn't free space available at the TCAM 115 for storing the new TCAM entry, then the other TCAM entries are moved around to make free space in the TCAM 115. The routing table 125 is also used to originally populate entries in the TCAM 115 when the TCAM 115 is initialized and populated with entries.

After the new TCAM entry is stored in the TCAM, the network device 100 determines how the incoming packet is to be processed by looking up information in TCAM 115. The incoming packet is then processed according to the information retrieved from the action entry of the TCAM 115.

Since processing performed by forwarding engine 110 is performed at a high packet rate in a deterministic manner, forwarding engine 110 is generally a dedicated hardware device configured to perform the processing. In one embodiment, forwarding engine 110 may be a programmable logic device such as a field programmable gate array (FPGA). Forwarding engine 110 may also be an ASIC. The CPU 120 can be a general purpose microprocessor such as a PowerPC, Intel, AMD, or ARM microprocessor, operating under the control of software stored in a memory accessibly coupled to the CPU 120. CPU 120 is used for programming and maintenance of tables and information in TCAM 115 and other memories.

In one embodiment, network device 100 may include multiple line-cards, with each line-card including the components depicted in FIG. 1A. In such an embodiment, an output port to which an incoming packet is forwarded for transmission from the network device 100 may lie on the same linecard as the input port or on a different line-card.

FIG. 1B illustrates the organization of information stored in the routing table 125, which is used to determine where the new TCAM entry is to be inserted, and includes a routing binary tree 150, a chain 155, and a TCAM table 160. The routing binary tree 150 shows all of the TCAM 115 entries organized into nodes within the routing binary tree. The nodes A, B, D, E, F, G, H, I, J, K arranged in the routing binary tree 150, are all the TCAM 115 entries. Since the TCAM 115 entries correspond to prefixes of incoming packets, the nodes A, B, D, E, F, G, H, I, J, K all correspond to the different prefixes of all incoming packets that arrived at ports 105 and were sent to forwarding engine 110.

A node is a TCAM entry, which can be an entire prefix of an IP address or can represent a portion of a prefix of an IP address with trailing bits treated as wildcards, can denote the aggregation of several 32-bit destination IP addresses. For example, the aggregation of 256 addresses 102.22.2.0 through 102.22.2.255 is represented by the prefix 102.22.2.0/24, where 24 is the length of the prefix, and the last 8 bits are wildcards. In routing binary tree 150, nodes B,D and E can be, for example, IP addresses 102.0.0.0/8, 102.22.0.0/16, and 102.22.2.0/24, respectively. Since I is a child of B, I can have a TCAM entry of 102.21.0.0/16. Since J is a child of D, J can have a TCAM entry of 102.22.3.0/24. Since F and K are children of E, F and K can have TCAM entries of 102.22.2.16/28 and 102.22.2.32/28. Since G is a child of F, G can have a TCAM entry of 102.22.2.17/32. Because E has a TCAM entry of 102.22.2.0/24, its children's length must be greater 24. If 28 is chosen as an example, then the higher 4 bits of the last byte must be different. In this case, F=0.16 (0001 0000)/28 and K=0.32 (0002 0000)/28 can be chosen. If G is a child of F, then G=0.17 (0001 0001)/32 is chosen.

The nodes A, B, D, E, F, G, H, I, J, K, which correspond to prefixes of IP addresses, can be stored in the reverse order in the TCAM 115. For example, node H can be stored anywhere in TCAM 115 with respect to node J. However, node H must be stored at a higher location in TCAM 115 then node A. Similarly, node J must be stored at a higher location (lower index) in TCAM 115 than node D, node D must be stored at a higher location in TCAM 115 than node B, and node B must be stored at a higher location in TCAM 115 than node A.

Chain 155, which includes nodes A, B, D, E, F, G, represents a chain of nodes extracted from the binary tree 150. The chain 155 is a path from a root of the binary tree 150 to a leaf node of the binary tree 150. Since nodes A, B, D, E, F, G, which correspond to prefixes of IP addresses, are in the same chain 155, nodes A, B, D, E, F, G must be stored in the reverse order as shown in TCAM table 160. In other words node G must be stored at a higher location in TCAM 115 than node F, node F must be stored at a higher location in TCAM 115 than node E, node E must be stored at a higher location in TCAM 115 than node D, node D must be stored at a higher location in TCAM 115 than node B, and node B must be stored at a higher location in TCAM 115 than node A. If the TCAM entries identified as nodes need to be moved in order to create a new node, the order of the nodes in the chain is preserved. This constraint is referred to as the chain-ancestor ordering constraint. In one embodiment, every chain, such as for example, A, B, D, J, must satisfy this constraint.

When a route is learned, a corresponding TCAM entry is added. The prefix of the route is first compared to the nodes of the routing binary tree 150 to determine in between which two nodes it is to be entered. The chain 155, which corresponds to these two nodes, is then determined and a new node is created by allocating the nodes of the chain, as is further discussed below with reference to FIGS. 2-6C. For example, if the route has a prefix that should be entered between nodes B and D then the chain 155 including nodes A, B, D, E, F, G is selected. Alternatively, chains of A, B, D, J or A, B, D, E, K can also be selected. However, the chain A, B, I cannot be selected because this chain does not include the nodes B and D. A node in the chain can have both ancestors and descendents. The ancestors are the nodes that are higher in the tree than a specific node whereas the descendents are the nodes that are lower in the tree than a specific node. For example, in chain 155 node B has ancestor A and descendents D, E, F, G.

When a new route is learned, a corresponding TCAM entry position must be inserted in a TCAM location that is located between its parent and children TCAM locations. If there is no free TCAM entry between its parent and children TCAM locations, then TCAM movements are required to make a space for the new route. TCAM movements are achieved by copying the content of one entry to an available entry and deleting the old entry content, or copying another entry over the old TCAM entry contents.

Figure 2A:
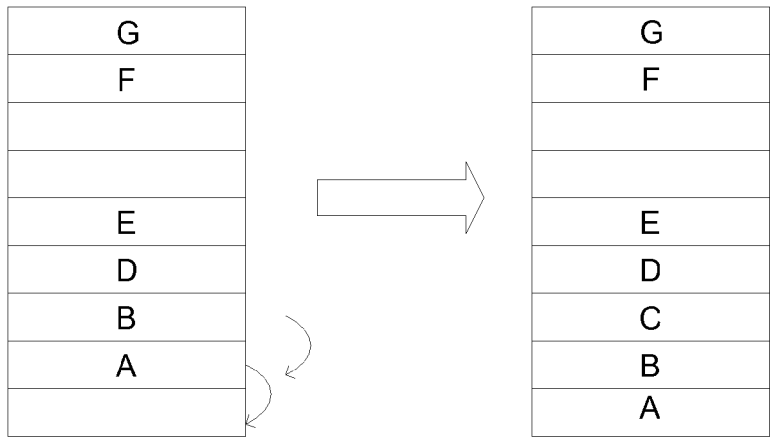
FIGS. 2A-2B illustrate techniques for assigning a prefix in a TCAM table between nodes.
Figure 2B:
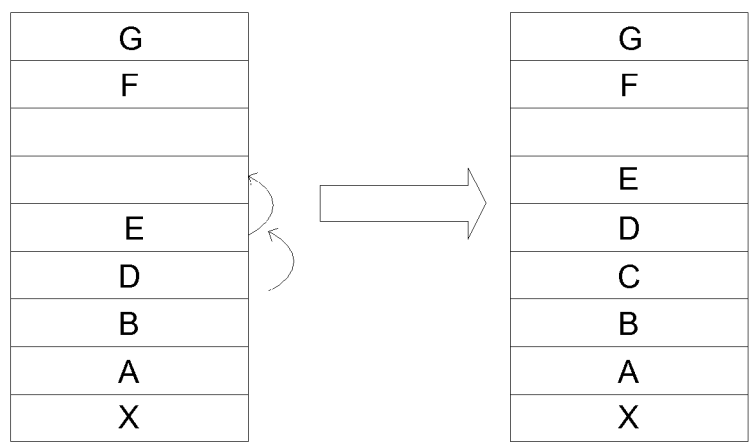

FIGS. 2A and 2B illustrate methods for assigning a prefix from a learned route to a free TCAM entry in TCAM 115, using the routing binary tree 150, in accordance with embodiments of the invention. FIG. 2A illustrates the TCAM table 160 before and after a prefix C is inserted so that the ancestors A and B are each re-allocated so that their respective TCAM entries are moved down by one place. FIG. 2B illustrates the TCAM table 160 before and after an entry C is inserted so that the descendents D and E are each re-allocated so that their respective TCAM entries are moved up by one place. Routing binary tree diagram 150 includes nodes that can have none or one direct parent, and none, one or two children. Each node has a TCAM entry as illustrated in TCAM table 160. The TCAM entries of ancestors and descendents are in order and TCAM entries between siblings do not matter.

When inserting a prefix C into the TCAM 115, an attempt is first made to find a free TCAM entry between nodes B and D of TCAM 115. If a free TCAM entry is available, the prefix C is stored in the free TCAM entry. If a free TCAM entry cannot be found between nodes B and D, then a chain which includes all ancestors of the node B and all descendents closer to their parents than their siblings is formed. The purpose is to maintain the TCAM order of this chain plus the prefix C. For example, if a prefix C is to be added between nodes B and D shown in routing binary tree 150, the chain would include nodes A, B, D, E, F and G as shown in the chain 155. Nodes A and B are ancestors, and the rest are descendents. Nodes E and F are chosen because they are closer to their parents than their siblings, nodes J and K, respectively. The relative up and down positions of TCAM entries is opposite to the binary tree. If a prefix C is higher than another entry (e.g., B to E) in routing binary tree, its TCAM position should be lower because it's descendent has a longer match and should be placed in the upper location of the TCAM. If two entries are not related, their TCAM locations are irrelevant.

Once the chain 155 is formed, an attempt is made to find a TCAM entry below B and closest to B, according to an embodiment. If a free entry is available, TCAM movements are performed to move the prefix C's ancestors so C can occupy B's place. For example, if the free entry is between node A and B, then the TCAM entry identified as node B is moved to the free space and B's old location is assigned to prefix C. If the free entry is below A, then the TCAM entries identified as node A is moved to the free space, the TCAM entry identified as node B is moved to the TCAM entry identified as node A's old place, and the TCAM entry identified as node C is put in the TCAM entry identified as node B's old place as shown in FIG. 2A. The arrows in FIG. 2A indicate the movement of the TCAM entries identified as nodes A and B.

In another embodiment, an attempt is made to find a TCAM entry above D and closest to D. If a free entry is available, TCAM movements are performed to move prefix C's descendents so C can occupy D's place. Similar procedures are performed, as were previously performed to move the TCAM entries identified as nodes below B in the chain, so that prefix C can be placed in D's old location. For example, if the available entry is between nodes E and F, node E is pushed to the free space, node D is pushed to E's old location, and finally prefix C is placed in D's old location, as shown in FIG. 2B. The arrows in FIG. 2B indicate the movement of the TCAM entry identified as nodes D and E.

In still another embodiment, if a free TCAM entry cannot be found between nodes B and D, then attempts can be made to find both a free TCAM entry below B and closest to B as well as above D and closest to D. A choice can then be made to decide which one to use. In one embodiment the choice can be whichever takes less movement. For example, if the steps illustrated in FIG. 2B takes just one movement, and the steps illustrated in FIG. 2A takes two movements, then the process using the steps illustrated in FIG. 2B will be chosen.

Figure 3:
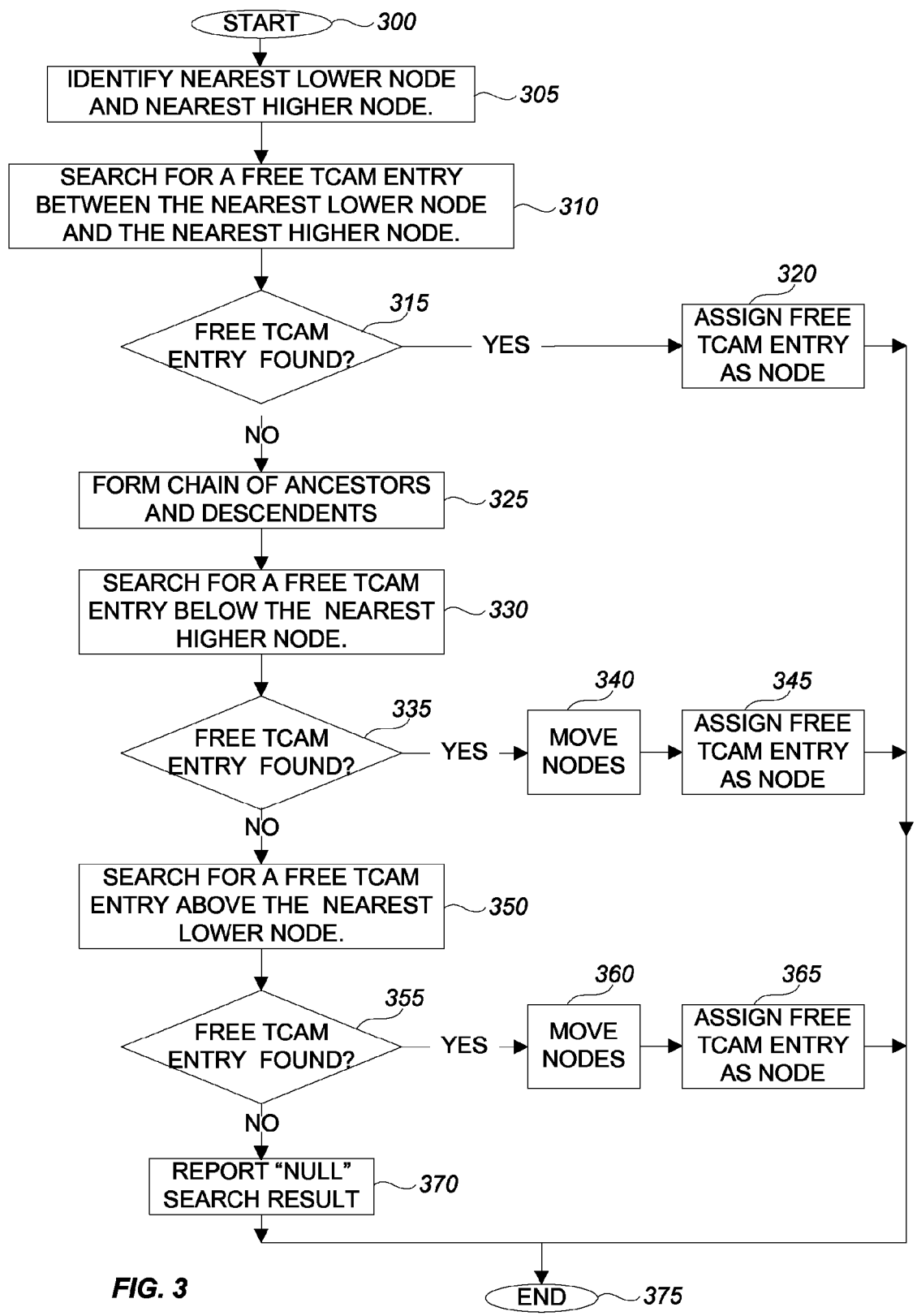
FIG. 3 is a flowchart illustrating a method of assigning a prefix to a TCAM.

FIG. 3 is a flowchart illustrating a method for assigning a prefix of a learned route to a free TCAM entry. The method begins in step 300 when a network device learns a route which has a prefix and an action. Once it is determined that the prefix is not in the TCAM then the process of assigning the prefix to a free TCAM entry begins. In step 305 a first node (parent) and second node (child) in a binary tree of a routing table are identified such that the first node is the nearest higher node to the prefix and the second node is the nearest lower node to the prefix. Next in step 310, a first search is done to locate a free TCAM entry between the first node's and the second node's corresponding TCAM entries. In step 315, it is determined whether a free TCAM entry was found in 310. If a free TCAM entry was found, then in step 320 the prefix is assigned to the free TCAM entry. If a free TCAM entry is not found in between the first node and the second node, then a chain of ancestor nodes and descendent nodes is formed in step 325. Next in step 330, a second search for a free TCAM entry is done. The second search is for a TCAM of less priority (i.e. higher index). Since the nearest higher tree node is the inserted tree node's parent, the second search is performed for a TCAM of less priority.

This second search, done in step 330, is performed in the TCAM to find an empty TCAM entry below (higher indexed) the entry storing information for the first node, which is along the nodes identified in the chain of ancestors in step 325. In step 335, a decision is made it is whether a free TCAM entry was found in 330. If a free TCAM entry was found in the second search, then in step 340 the TCAM entries identified as nodes are moved along the chain of ancestors leaving the first node as a free TCAM entry. The TCAM entries identified as nodes are moved by shifting the contents of all the TCAM entries by one, and one at a time, so that their order is preserved while at the same time making the first node (parent) a free TCAM entry. Further details regarding the movement of the TCAM entries identified as nodes are provided below with reference to FIGS. 2A-2C. Next in step 345, the free TCAM entry, which is identified as the second node, is assigned as a free node. If a free TCAM entry was not found in the second search, then in step 350 a third search for a free TCAM entry is done.

This third search, done in step 350, is performed above the second node's TCAM entry along the nodes identified in the chain of descendents in step 325. Next in step 355, a decision is made whether a free TCAM entry was found in the third search 350. If a free TCAM entry was found in the third search, then in step 360 the TCAM entries identified as the nodes are moved along the chain of ancestors leaving the second node (child) as a free TCAM entry. The TCAM entries of the nodes are moved by shifting the contents of all the TCAM entries by one, and one at a time, so that their order is preserved while at the same time making the second node a free TCAM entry. Further details regarding the movement of TCAM entries identified as the nodes are provided below with reference to FIGS. 3A-3C. Next in step 365 the free TCAM entry, which was previously identified as the second node, is assigned the prefix. If a free TCAM entry was not found in the third search, then in step 370 a null result is returned to the CPU. The method ends in step 375 when the prefix is entered in the free TCAM entry.

Figure 4A:
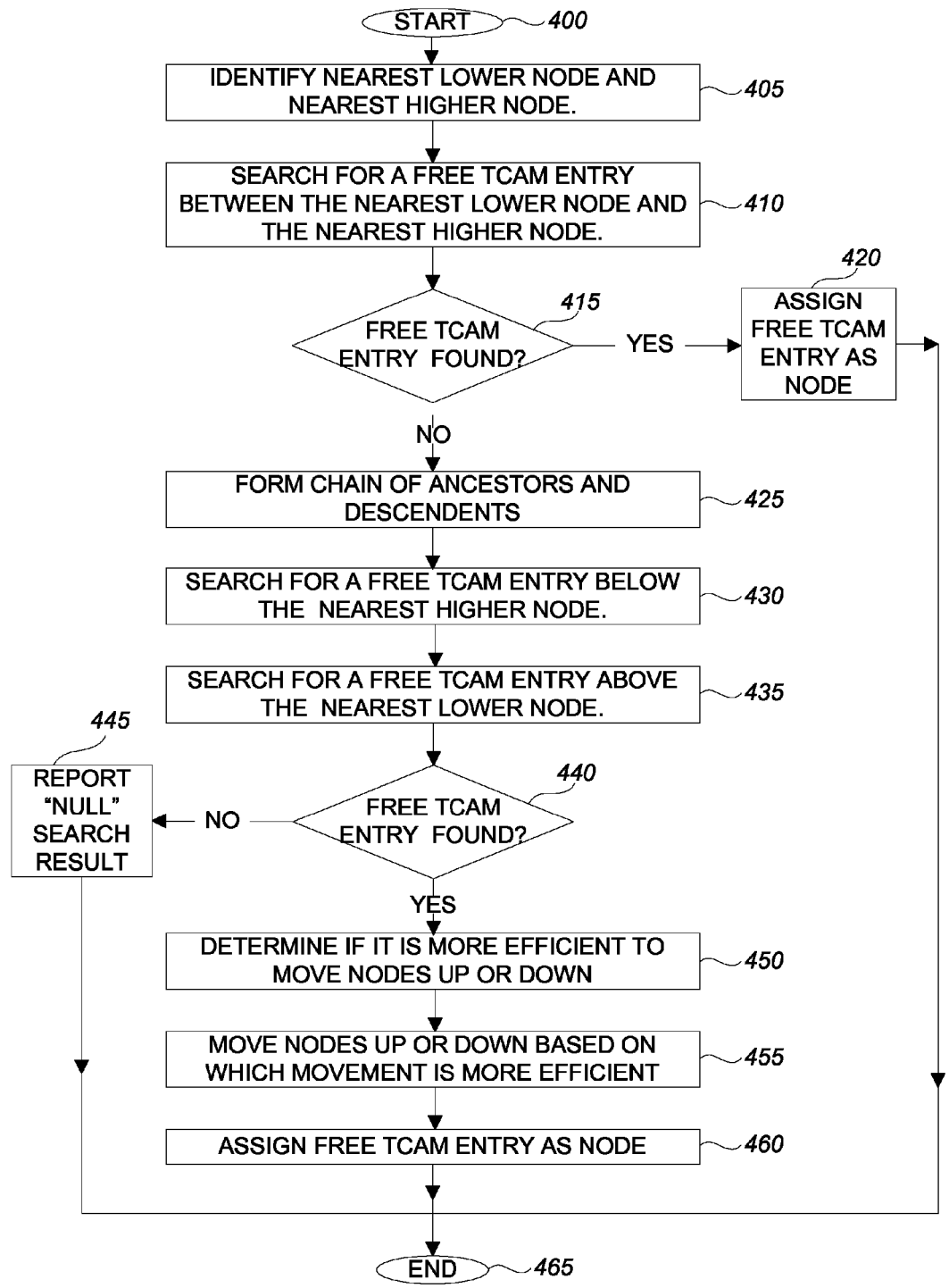
FIG. 4A is a flowchart illustrating an optimized method for assigning a prefix to a TCAM.

FIG. 4A is a flowchart illustrating an optimized method for assigning a prefix of a learned route to a free TCAM entry. The method begins in step 400. Once it is determined that the route prefix is not in the TCAM then the process of assigning the prefix to a free TCAM entry begins. In step 405 a first node and second node in a binary tree of a routing table are identified such that the first node is the nearest higher node to the prefix and the second node is the nearest lower node to the prefix. Next in step 410, a first search is done to locate a free TCAM entry between the first node and the second node. In step 415, it is determined whether a free TCAM entry was found in 410. If a free TCAM entry was found, then in step 420 the prefix is assigned to the free TCAM entry. If a free TCAM entry was not found in between the first node and the second node, then a chain of ancestor nodes and descendent nodes is formed in step 425. Next in steps 430 and 435, additional searches for a free TCAM entry are done.

The second search, done in step 430, is performed in the TCAM to find an empty TCAM entry below the entry storing information for the first node, which is along the nodes identified in the chain of ancestors in step 425. The third search, in step 435, is done in the TCAM to find an empty TCAM entry above the entry storing information for the second node, which is along the nodes identified in the chain of descendents in step 425. In step 440, a decision is made whether a free TCAM entry was found in either step 430 or step 435. If a free TCAM entry was not found in either of the searches in steps 430 and 435, then in step 445 a null result is returned to the CPU. If a free TCAM entry was found in either of the searches done in step 430 and step 435, then in step 450 a determination is made whether it is more efficient to move TCAM entries identified as nodes up through the ancestor chain of nodes or down the descendent chain of nodes. This decision can be based on the number of moves that would be required.

After a determination is made in step 450 whether it is more efficient to move TCAM entries identified as nodes up the chain of ancestors or down the chain of descendents, then in step 455 the TCAM entries identified as nodes are moved along the chain of ancestors or descendents, depending on which move if more efficient, leaving either the nearest lower node or nearest higher node as a free TCAM entry. The TCAM entries identified as nodes are moved by shifting the contents of all the TCAM entries by one, and one at a time, so that their order is preserved while at the same time making the second node a free TCAM entry. Further details regarding the movement of the TCAM entries identified with nodes are provided above with reference to FIGS. 2A-2C. Next in step 460, the free TCAM entry is assigned as a free node. The method ends in step 465 when the prefix is entered in the free TCAM entry.

In accordance with embodiments of the methods described in FIGS. 3 and 4A, the TCAM is not partitioned into multiple regions and there is no requirement for a contiguous region of free TCAM entries. Therefore, the TCAM 115 can be partition free and the entries can be in a non-contiguous region. Additionally, there is no requirement that the complete routing binary tree be known before programming the TCAM.

To delete a node, a TCAM entry is marked as a free entry and no movements are needed.

Figures 4B, 4C:
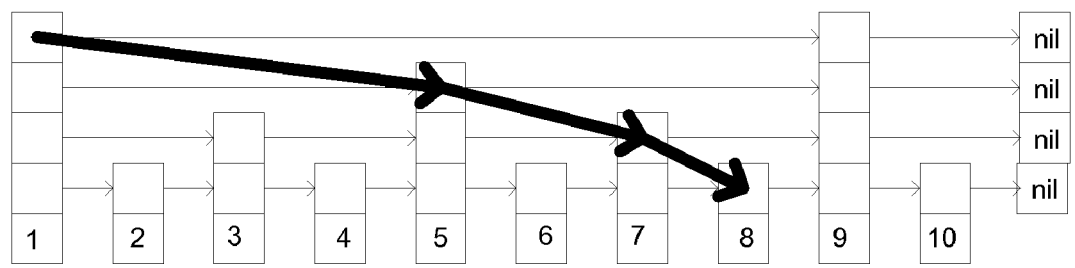
FIGS. 4B-4C are schematic illustrations showing methods of searching for a free TCAM entry in a specified range.

FIG. 4B is a schematic illustration showing a method of searching for a free TCAM entry in a specified range, which uses an array of "use" bit or byte to represent whether a corresponding entry is used or not used. The method searches the specified range one by one with the desired direction to find a free entry. Although this approach is robust it is slow and therefore used in a TCAM having a small number of entries. The search time using this method is proportional to N, where N is the number of entries.

FIG. 4C is a schematic illustrations showing a second method of searching for a free TCAM entry in a specified range, which uses Skip Lists wherein every list that contains a free entry is sorted and linked to form a long linklist. In order to avoid slow searching (e.g. one by one as shown in FIG. 4B) to find an entry, upper layers are identified and made of links that serve as fast tracks. As the layer moves up, its length of linklist decreases exponentially as illustrated in FIG. 4C. The search time using this method is proportional to log(N), where N is the number of entries. Although this method is significantly faster than the method described above with reference to FIG. 4B, this method uses a complicated data structure that consumes much more memory.

A binary tree, which is not related to the routing tree, is used for storing all available TCAM indexes. The binary tree is made of nodes and each node can have 0 to 2 children. The binary tree starts from one root node, and all other nodes are descendants of the root. Every node, except the root, must have a parent. Each tree node's content is a range of contiguous available TCAM indexes. At first, the tree has only one single node whose range is the entire TCAM range. As more and more TCAM allocation goes on, the available TCAM ranges are fragmented, and the binary tree has more nodes to cover all disjoint ranges.

Figure 5:
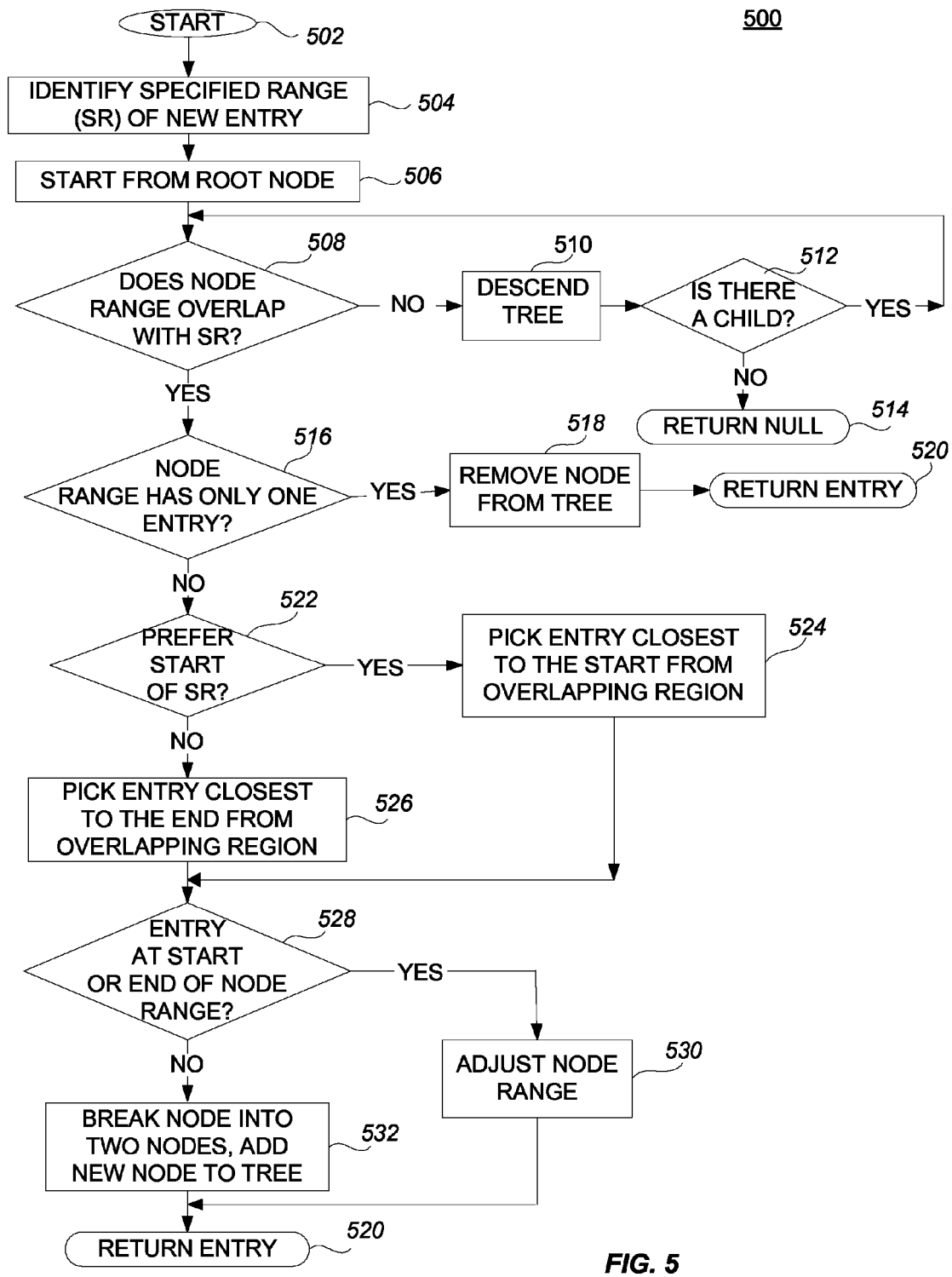
FIG. 5 is a flowchart illustrating a method of searching for a free TCAM entry in a specified range of a TCAM.

FIG. 5 is a flowchart 500 illustrating a method of searching for a free TCAM entry in a specified range. The method begins in step 502 after a decision has been made to search for a free TCAM entry to store a value having a specified range (SR). Additionally, a predetermined preference to the start of the specified range or the end of the specified range is provided, if multiple available entries qualify to be in the range. The predetermined preference, which is either the start or end of the specified range, can be predetermined by a user or by an algorithm or it can be fixed to always be the start of the specified range or the end of the specified range. In step 504, the SR of the new entry is identified. Next in step 506, the root of the binary tree is the starting node. In step 508, the identified node is examined to determine if SR overlaps with the range of the node. Since the node range identifies available entries, the overlap between SR and the node range identifies qualified available entries. If there is no overlap, then in step 510 an attempt is made to descend the tree. If the SR is smaller than the node range, the tree is descended to its left child that stores smaller range start, otherwise, the tree is descended to its right child that stores larger range start. In step 512, a decision is made whether the node has such a child. If the decision is that there is no such child, then the end of the tree is reached and the method goes to step 514 which returns a NULL result to indicate that no free entry exists satisfying the SR requirement. If the decision in step 512 is that there is such a child, then the method goes back to step 508 with the child node as the searching node. These steps enable searching all the nodes of a binary tree by starting at the root and searching the nodes of the binary tree in descending order.

If the decision in step 508 is that there is overlap between the SR and the node range, then the method goes to step 516 to determine whether the node range has only one entry. If there is overlap then there are available entries satisfying the SR requirement. If the decision in step 516 is that there is only one entry, then the method goes to step 518 to remove the node from the tree and return this entry in step 520. If the decision of step 516 is that, NO—the node range has more than one entry, then a decision is made which entry to use.

This decision process is started in step 522. If the predetermined preference is the start of the SR, then an entry closest to the start of SR is picked from the overlapping region in step 524. If the predetermined preference is the end of the SR, then an entry closest to the end of SR is picked from the overlapping region in step 526. After both steps 524 and 526, the method continues to step 528 which verifies whether the picked entry is at the start or end of the node range. If the picked entry is at the start or the end of the node range, then the node range is adjusted in step 530. The node range is adjusted by either incrementing the start of the node range if the entry is the start of the node range, or decrementing the end of the node range if the entry is the end of the node range. Next in step 520, the available entry is returned. If the decision in step 528 is that the picked entry is neither at the start of the node range nor at the end of the node range, then the node is broken up into two nodes by breaking the range into two ranges plus the entry. The original node has the range from the start to the entry index minus one. The new node has the range from entry index plus one to the end. The new node is inserted into the tree. Next in step 520, the available entry is returned. Details of node insertion are discussed below.

In FIG. 5, an input of the range (start and end) and the predetermined preference identifying the start or end of the SR (i.e. a preference to the start or end) are provided. This is in contrast to steps 310 and 410, described earlier with reference to FIGS. 3 and 4 respectively, where the predetermined preference, which specifies the start or end of the SR, is not available. In one example, the predetermined preference identifying the start or end of the SR is provided at the start while calling FIG. 5. If a free entry for the specified range (SR) in FIG. 5 cannot be found, then a search of the region below and/or above the SR is performed, as described in steps 330 and 350 of FIG. 3, or steps 430 and 435 of FIG. 4A. Searching the region below the SR is done by specifying the new SR from the origin of the TCAM (i.e. position zero) up to the start of the original SR with preference of end. Thus, if multiple free entries are in the range of the origin of the TCAM to the start of the original SR, then the entry closest to the end of new SR that is start of the original SR is returned. Similarly, searching the region above SR is performed by searching from the end of the original SR up to the maximum TCAM with preference of beginning. If multiple free entries are found in the range between the end of the original SR and the maximum TCAM then, the entry closest to the end of the original SR is returned.

Figure 6A:
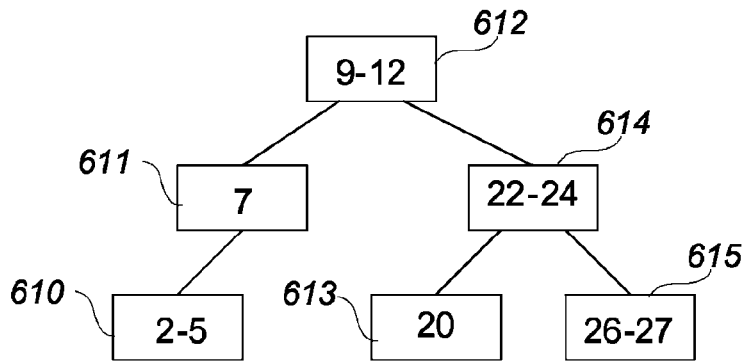
FIGS. 6A-6C are schematic illustrations showing methods of searching for a free TCAM entry in a specified range.
Figure 6B:
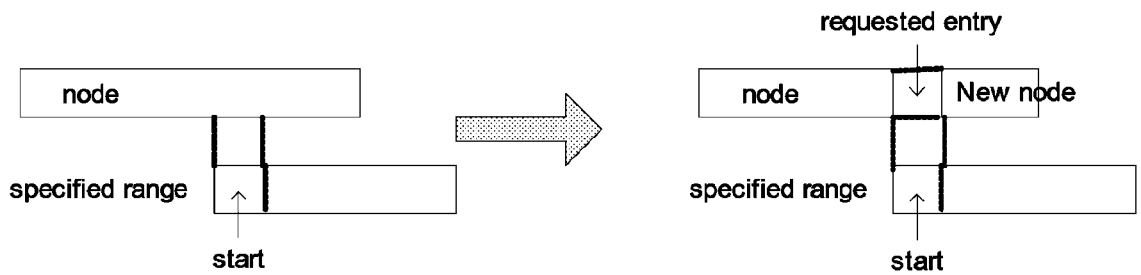
Figure 6C:
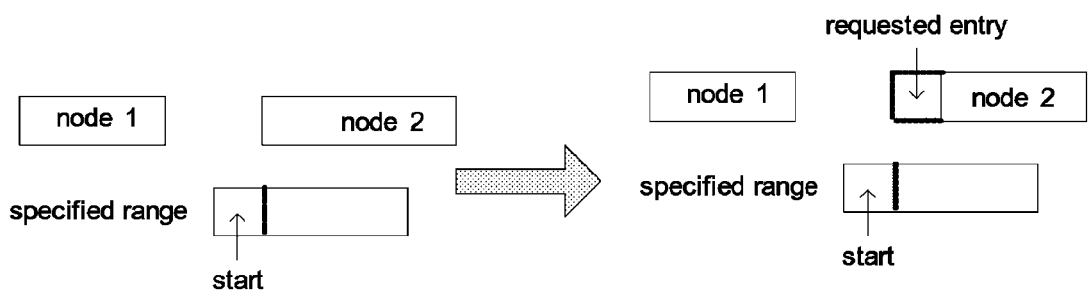

FIG. 6A-6C are schematic illustrations showing methods of searching for a free TCAM entry in a specified range, as described above with reference to FIG. 5. This method is efficient in both speed and memory usage and can therefore be used in TCAMS having large numbers of entries. The method described earlier with reference to FIG. 5 and illustrated in FIG. 6A-6C has a search time proportional to log(N), where N is the number of tree nodes that is significantly smaller than the number of TCAM entries because each node describes a range. The memory consumption is far less than the memory consumption of the method described above with reference to FIGS. 4B and 4C. A contiguous region is first put into each node as illustrated in the binary tree illustrated in FIG. 6A, which shows entries 2,3,4,5,7,9,10,11,12, 20, 22,23, 24, 26, 27 are free and six nodes (610-615) are used to store entries 2-5, 7, 9-12, 20, 22-24, 26-27. The binary tree 605 holds all of the entries in these 6 nodes. The time needed to search the nodes of the binary tree 605 is proportional to log(N).

FIGS. 6B and 6C are schematic illustrations showing methods of searching for a free TCAM entry in a specified range. If there are multiple free qualified entries, a preference to finding the free entry closest to the start of the specified range or to the end of the specified range is predetermined and can be provided. The search begins by descending the binary tree from the root searching for a node whose range overlaps with SR. Two disjoint regions, identified as the first region and the second region, are defined so that the first region has an SR start and end that are both smaller than the node range start and the second region has an SR start and end that are both larger than the node range end. In one embodiment, overlapping means not disjoint. The searching is done by comparing SR with the range of the node, and if there is overlap, then the node is identified as the desired node. If the SR and node are disjoint, then the search must descend to the child node. If SR start is smaller than the node range start, then the search continues by descending to the node's left child. If the SR start is larger than the node range start, then the search continues by descending to the node's right child. If there is no such child, then the search fails.

If a node is found, then the search selects an entry and adjusts the node. If this node contains only one entry, then the node is removed from the binary tree. Otherwise, the search selects an entry from the overlapping part based on the predetermined preference, which can be the start of the specified range or the end of the specified range. FIGS. 6B and 6C show two cases where the predetermined preference is the start. Both cases select the start of overlapping region as the requested entry. The requested entry is at the start or end of the node range in FIG. 6C, and neither the start nor the end of FIG. 6B. In FIG. 6B the node range is broken into two regions separated by the requested entry. The old node contains a range smaller than the requested entry. A new node is created to contain a range larger than the requested entry. The new node is inserted into the binary tree. In FIG. 6C the node range is adjusted by incrementing the range by one if the requested entry is the range start. If the requested entry is at the node range end, the new node range end is decremented by one. The requested entry is returned.

In another embodiment, a method of freeing a TCAM entry having a number "X" is provided. The search method begins by descending the binary tree from the root, while searching for a node whose range is adjacent to "X." The searching is done by comparing "X" with the range of the node, and if "X" is adjacent to the range, then the node is identified as the desired node. If "X"+1 is smaller than the entries in the range, then the search continues by descending to the node's left child. Otherwise, the search continues by descending to the node's right child. If there is no such child, then the search fails. If a node's range start is equal to "X"+1, the node's start is decremented by 1 to include "X." A defragmentation is performed to merge possible node regions together. A search of the tree to find any node contains "X"−1 is also performed. If such a node is found, then the two nodes are merged into a single node by enlarging one node range and deleting the other node from the binary tree. If a node's range end is equal to "X"−1, the range end is incremented to include "X." Similarly, a search of the tree for a node containing "X"+1 is performed. If such node is found, then the two nodes are merged into a single node by enlarging one node range and deleting the other node from the binary tree. If this method of searching a node whose range start is "X"+1 or range end is "X"−1 is unsuccessful, then the freed "X" is disjoint from any node range. Thus, a node containing just this free entry is inserted into the binary tree. The insertion is done by descending the tree by comparing "X" with the node's range. If "X" is smaller than the node's range start, then the tree is descended to its left child, otherwise the tree is descended to its right child.

The following two ways can be used for tree node insertion. The first method that can be used for tree node insertion is to descend down the tree to the node that has no qualified child node and attach the new node to be the child node. For example, as the tree is descended, it is descended to a node's right child. If the node has no right child, then a new node is attached to be the right child of the node. The second method that can be used for tree node insertion is to descend the tree until "X" is between the range starts of a parent node and its child node. The child node from the parent node is removed. The child node is attached to be a child of the new node and the parent's child node is replaced with the new node. For example, suppose "X" is larger than node B's range start, and smaller than B's right child C's range start, then the new node is made to be the right child of B. Node C is then attached to be the right child of the new node.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method, comprising:
    forming a chain of nodes, wherein the nodes have an order and each node is identified with a ternary content-addressable memory (TCAM) entry;
    determining a location in the TCAM where a prefix is to be inserted;
    identifying a first node that is nearest to the location and either higher or lower than the location;
    identifying a free TCAM entry that is nearest to the location;
    moving the TCAM entry identified as a node to the nearest free TCAM entry;

freeing the first node;
inserting the prefix in the first node;
wherein moving the TCAM entry identified as the node to the free TCAM entry and freeing the first node preserves the order of nodes in the chain of nodes.

2. The method of claim 1 wherein moving the TCAM entry identified as the node to the nearest free TCAM entry is moving the TCAM entry identified as the first node to the nearest free TCAM entry.

3. The method of claim 2 wherein freeing the first node is storing the contents of the first node in another TCAM entry making the first node available for inserting the prefix.

4. The method of claim 1 further comprising:
moving the TCAM entry identified as a second node to the node TCAM entry after the TCAM entry identified as the node is moved; and
moving the TCAM entry identified as the first node to the second node TCAM entry after the TCAM entry identified as the second node is moved.

5. The method of claim 4 wherein freeing the first node is storing the contents of the first node in another TCAM entry making the first node available for inserting the prefix.

6. A method, comprising:
forming a chain of nodes, wherein the nodes have an order and each node is a ternary content-addressable memory (TCAM) entry;
determining a range of TCAM entries in which a prefix is to be inserted, the range of the TCAM entries having a first node as an end point;
determining a location of a free TCAM entry that is nearest to where the prefix is to be inserted;
upon determining that the location of the free TCAM entry is within the range, inserting the prefix in the free TCAM entry;
upon determining that the location of the free TCAM entry is not within the range;
moving the TCAM entries identified as the nodes in the chain of nodes to free the first node;
inserting the prefix in the free first node;
wherein moving the TCAM entries identified as the nodes in the chain of nodes preserves the order of the nodes.

7. The method of claim 6 wherein moving the TCAM entries identified as the nodes further comprises shifting the TCAM entries identified as nodes so that a TCAM entry identified as the first node occupies the free TCAM entry and making the TCAM entry identified as the first node a free node.

8. The method of claim 6 wherein moving the TCAM entries identified as the nodes further comprises shifting the TCAM entries identified as the nodes so that a second node occupies the free TCAM entry and the first node occupies the second node entry.

9. The method of claim 6 wherein moving the TCAM entries identified as the nodes further comprises shifting the TCAM entries identified as the nodes so that a third TCAM entry identified as a third node entry occupies the free TCAM entry, a second TCAM entry identified as a second node entry occupies the third node entry, and the first TCAM entry identified as the first node entry occupies the second TCAM entry identified as the second node entry.

10. The method of claim 6 wherein the first node is the nearest higher node to the prefix.

11. The method of claim 6 wherein the chain of nodes comprises all ancestors and all descendents of the first node.

12. The method of claim 11 further comprising:
identifying free TCAM entries in both the ancestor and descendents of the first node;
upon determining that there is not a free TCAM entry within the chain of nodes, determining if there is a free TCAM entry in the descendents portion of the chain of nodes;
upon determining that there is a free TCAM entry within the descendents portion of the chain of nodes, moving the TCAM entries identified as the nodes in the descendents portion of the chain of nodes to generate a free TCAM entry identified as a free node nearest to the prefix; and
inserting the prefix in the free node;
wherein moving the TCAM entries identified as the nodes in the descendents portion of the chain of nodes preserves the order of the nodes.

13. The method of claim 12 further comprising:
upon determining that there is not a free TCAM entry within the descendents portion of the chain of nodes, determining if there is a free TCAM entry in the ancestors portion of the chain of nodes;
upon determining that there is a free TCAM entry within the ancestors portion of the chain of nodes, moving the TCAM entries identified as the nodes in the ancestors portion of the chain of nodes to generate a free node nearest to the prefix; and
inserting the prefix in the free node;
wherein moving the TCAM entries identified as the nodes in the ancestor's portion of the chain of nodes preserves the order of the nodes.

14. The method of claim 11 further comprising:
upon determining that there is not a free TCAM entry within the chain of nodes, determining if there is a free TCAM entry in the ancestors portion of the chain of nodes;
upon determining that there is a free TCAM entry within the ancestors portion of the chain of nodes, moving the TCAM entries identified as the nodes in the ancestors portion of the chain of nodes to generate a free node nearest to the prefix; and
inserting the prefix in the free node;
wherein moving the TCAM entries identified as the nodes in the ancestor's portion of the chain of nodes preserves the order of the nodes.

15. The method of claim 14 further comprising:
upon determining that there is not a free TCAM entry within the ancestors portion of the chain of nodes, determining if there is a free TCAM entry in the descendents portion of the chain of nodes;
upon determining that there is a free TCAM entry within the descendents portion of the chain of nodes, moving the TCAM entries identified as the nodes in the descendents portion of the chain of nodes to generate a free node nearest to the prefix; and
inserting the prefix in the free node;
wherein moving the TCAM entries identified as the nodes in the descendents portion of the chain of nodes preserves the order of the nodes.

16. A method, comprising:
forming a chain of nodes, wherein the nodes have an order and each node is a ternary content-addressable memory (TCAM) entry;
determining a first node and a second node in the TCAM in between which a prefix is to be inserted;
determining if there is a free TCAM entry between the first node and the second node;

storing the prefix in the free TCAM entry upon determining that a free TCAM entry does exist between the first node and the second node;

upon determining that a free TCAM entry does not exist between the first node and the second node;

determining if there is a free TCAM entry between ancestors of the first node;

upon determining that there is a free TCAM entry within the ancestors, shifting the ancestor nodes so that an ancestor node occupies the free TCAM entry and the first node is free, without loosing the order of the nodes in the chain, and storing the prefix in the first node; and upon determining that a free TCAM entry does not exist between the ancestor nodes, determining if there is a free TCAM entry between descendents of the second node; and upon determining that there is a free TCAM entry within the descendents, shifting the descendent nodes so that a descendent node occupies the free TCAM entry and the second node is free, without loosing the order of the nodes in the chain, and storing the prefix in the second node.

17. The method of claim 16 further comprising deleting a node by marking a TCAM as a free entry.

* * * * *